United States Patent
Smith, IV et al.

(10) Patent No.: US 6,607,006 B2
(45) Date of Patent: Aug. 19, 2003

(54) AMPLITUDE ATTENUATION OF TIME-VARIANT PROPERTIES OF FLUID STREAMS

(75) Inventors: Oliver Jacob Smith, IV, New Tripoli, PA (US); David Ross Graham, Lansdale, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/901,799

(22) Filed: Jul. 10, 2001

(65) Prior Publication Data

US 2003/0075222 A1 Apr. 24, 2003

(51) Int. Cl.$^7$ ................................................. G05D 7/00
(52) U.S. Cl. ......................... 137/601.18; 137/599.01; 137/601.18; 366/336; 366/340
(58) Field of Search ................ 137/601.18, 1, 137/599.01; 366/336, 340; 181/251, 268

(56) References Cited

U.S. PATENT DOCUMENTS

| | | | |
|---|---|---|---|
| 1,093,385 A | | 4/1914 | Clemmer |
| 1,491,049 A | | 4/1924 | Lichtenthaeler |
| 2,069,714 A | | 2/1937 | Getchell .................. 138/42 |
| 2,088,591 A | | 8/1937 | Ferkel ..................... 259/4 |
| 2,627,280 A | * | 2/1953 | Adelson ................ 137/599.09 |
| 2,740,616 A | | 4/1956 | Walden .................... 259/4 |
| 3,010,316 A | * | 11/1961 | Snyder .................. 137/599.05 |
| 4,313,680 A | | 2/1982 | Honnen ...................... 366/336 |
| 4,615,623 A | | 10/1986 | Wethern .................... 366/279 |
| 5,156,458 A | | 10/1992 | Hemrajani et al. ......... 366/336 |
| 5,984,045 A | * | 11/1999 | Maeda et al. .............. 181/254 |

FOREIGN PATENT DOCUMENTS

GB    2061744    5/1981   ............. B01F/5/00

OTHER PUBLICATIONS

Levenspiel: "Chemical Reaction Engineering", 1972, John Wiley & Sons, 1972, pp. 326–341.

Weinstein, H. & Alder, R. J., *Micromixing Effects in Continuous Chemical Reactors*, Chemical Engineering Science, vol. 22, pp. 65–75, 1967.

Nauman, E. B., *Residence Time Distribution Theory for Unsteady Stirred Tank Reactors*, Chemical Engineering Science, vol. 24, pp. 1461–1470, 1969.

Fogler, H. S., *Elements of Chemical Reaction Engineering*, $2^{nd}$ Edition, Prentice Hall, 1992, p. 493.

Levenspiel, O., *Chemical Reaction Engineering*, Second Edition, John Wiley & Sons, Inc. 1972, pp 253–301.

* cited by examiner

Primary Examiner—Stephen M. Hepperle
(74) Attorney, Agent, or Firm—John M. Fernbacher

(57) ABSTRACT

A method to reduce or attenuate the amplitude of time-variant properties of a fluid stream by introducing the stream into a defined enclosed volume in a controlled manner such that the residence time distribution of the fluid exiting the enclosed volume approaches that of a preferred flat residence time distribution. This is accomplished by the concept of temporal mixing in which different residence times are imparted to a fluid in a mixing zone by physically dividing the fluid into individual portions, each of which has a different residence time while passing through the mixing zone. The desired fluid portions are created by means of specifically-designed multiple inlets into the mixing zone and/or by means of specifically-designed multiple outlets from the mixing zone.

18 Claims, 12 Drawing Sheets

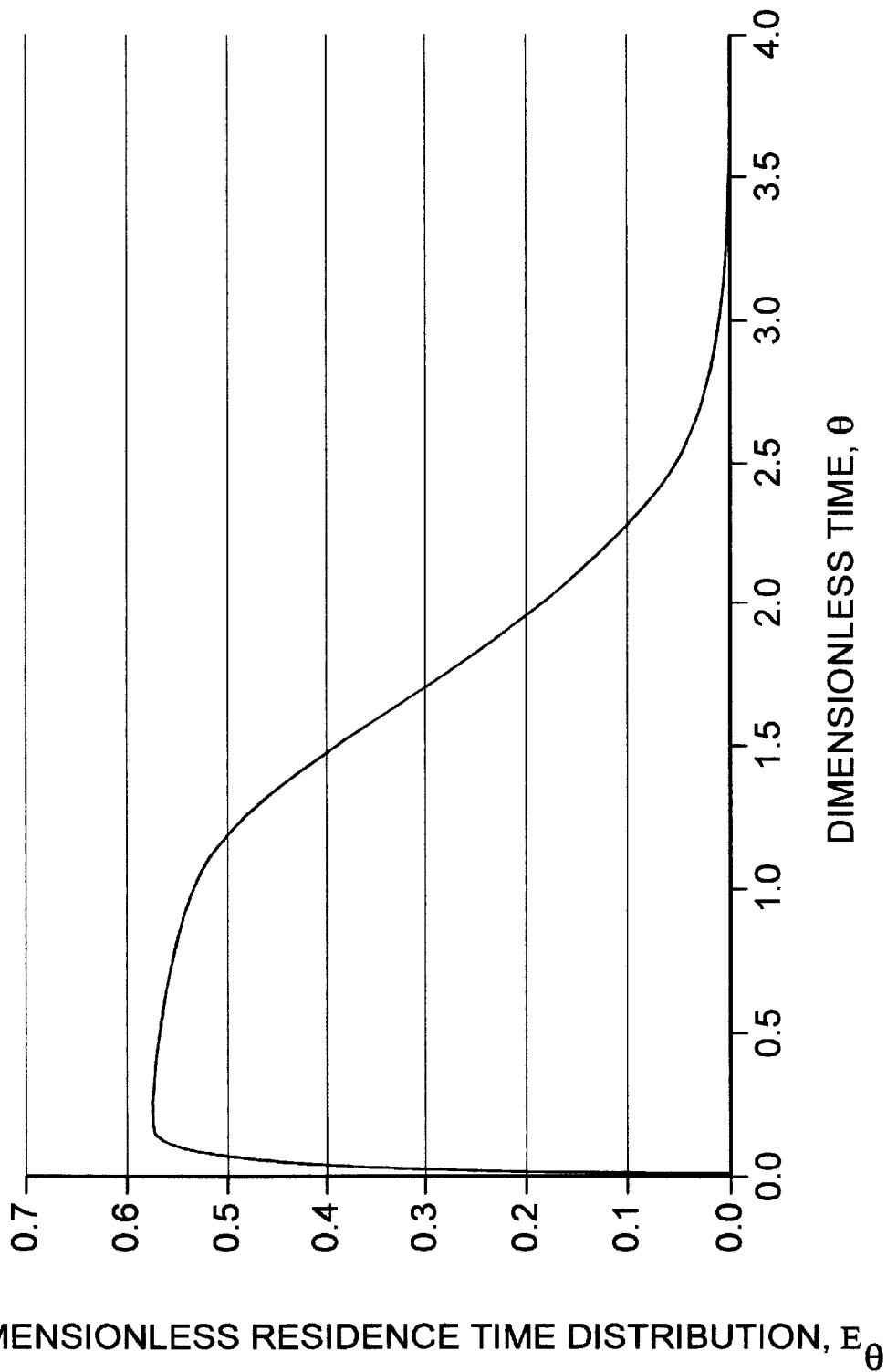

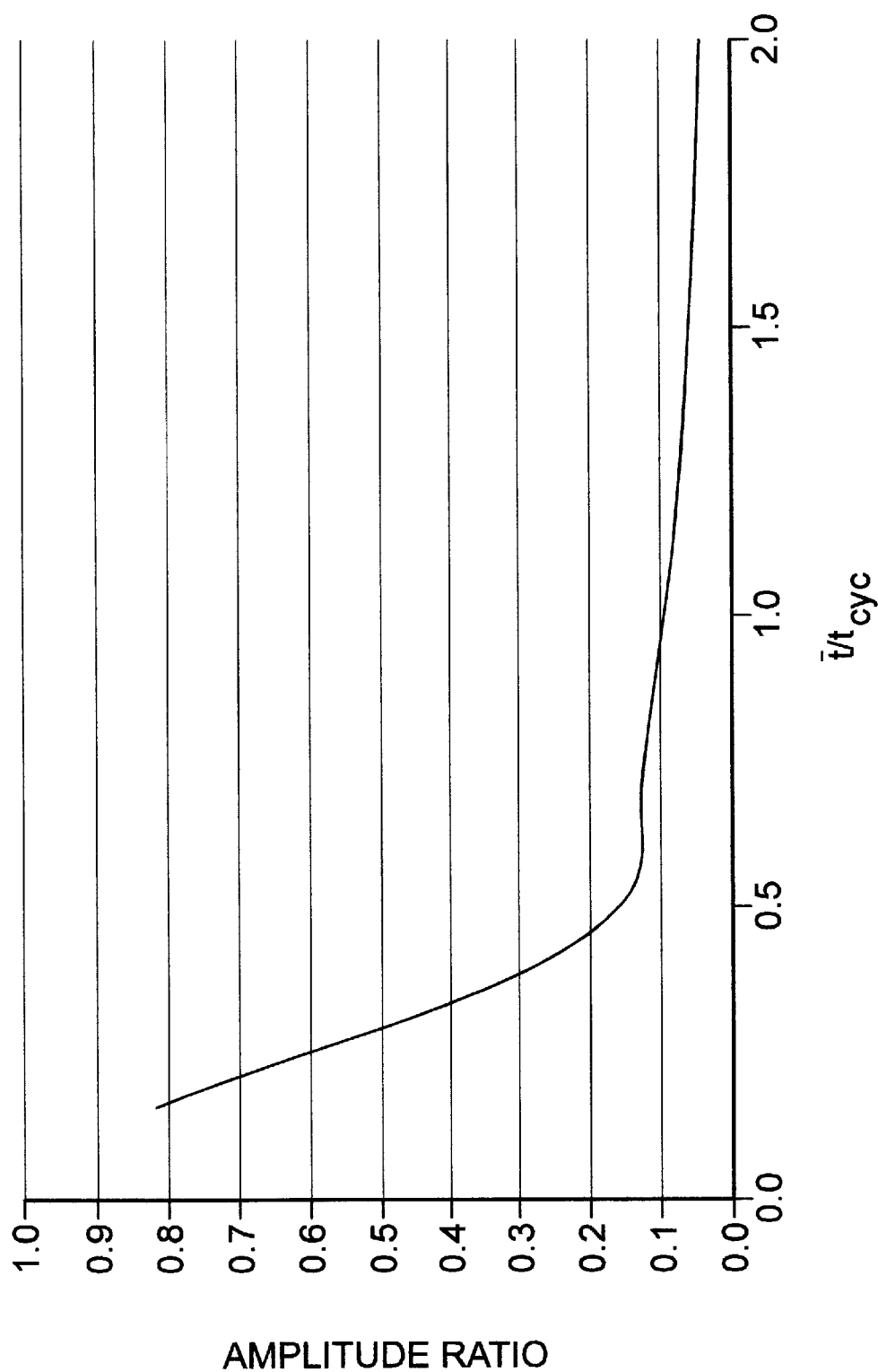

AMPLITUDE ATTENUATION OF TIME-VARIANT PROPERTIES OF FLUID STREAMS

BACKGROUND OF THE INVENTION

Fluid streams having time-variant properties are generated in many processes which operate in cyclic or discontinuous modes. The time variance of certain stream properties can adversely affect the use of the stream elsewhere in the process or in other applications. For example, in the recovery of hydrogen from synthesis gas by pressure swing adsorption, blowdown and purge streams are generated in which the concentrations of combustible components vary periodically with time. These byproduct streams typically are used as fuel to fire a process furnace, and the performance of the furnace can be adversely affected by the resulting time-variant heating value of the fuel stream. Other examples can be found in cyclic or discontinuous processes such as the smelting of ore in the primary metals industries, operation of batch chemical reactors or the venting of process upsets to buffer tanks in the chemical process industries, and variations in wastewater composition in wastewater treatment processes.

Typical time-variant stream properties are temperature, pH, and the concentrations of particular components in the stream. The amplitude of the time variance of the properties of such streams can be reduced or attenuated by two well-known methods.

In one method, something is added to or removed from the stream in a controlled manner to compensate for the variations. For example, heat can be added to or removed from a stream to control temperature or another stream can be added under controlled conditions to the time-variant stream, such as the addition of acid or alkali to control the pH of a stream. This method often is used when the time variance of a desired property is largely random in nature.

In the other method, the time-variant stream is introduced into a holding volume such that the natural capacitance of the volume reduces or attenuates the amplitude of the time variance of the outlet stream properties relative to the inlet stream properties. Nothing is added to or removed from the stream. Mixing of the fluid in the holding volume promotes a constant composition throughout the volume and improves the reduction of the time variance of the outlet stream relative to the inlet stream. This method often is used when the time variance of a desired property is primarily periodic in nature. Mixing can be effected by mechanical agitation, by inlet distributors or jets which utilize pressure drop to promote mixing, or by baffles which promote turbulence.

The appropriate use of liquid or gaseous byproduct streams can have a significant positive impact on the capital and operating costs of a process plant. When these byproduct streams have time-variant properties, mixing of some kind usually is required to reduce the time-variant properties before these byproduct streams are used in the process. Improved mixing methods thus are desirable to reduce initial plant investment and ongoing plant operating cost. The invention disclosed below and defined by the claims which follow offers a new method for attenuating the amplitude of time-variant properties of a fluid stream by controlled mixing in an enclosed volume.

BRIEF SUMMARY OF THE INVENTION

In one embodiment, the invention is a method for attenuating the amplitude of a time-variant property of a fluid stream which comprises introducing into an enclosed volume an inlet fluid stream having a time-variant property, dividing the fluid within the enclosed volume into portions of fluid having different residence times therein, combining the portions of fluid, and withdrawing from the enclosed volume an outlet fluid stream having an attenuated time-variant property such that the residence time distribution of the outlet fluid stream is characterized by a flatness constraint $F_\theta$ equal to or less than about 0.11 and a symmetry constraint $S_\theta$ equal or less than about 0.075, wherein the flatness constraint $F_\theta$ is defined as $$F_\theta = \int_0^2 [0.5 - E_\theta(\theta)]^2 d\theta + \int_2^\infty [E_\theta(\theta)]^2 d\theta$$

and the symmetry constraint $S_\theta$ is defined as $$S_\theta = \int_0^1 [E_\theta(\theta) - E_\theta(2-\theta)]^2 d\theta + \int_2^\infty [E_\theta(\theta)]^2 d\theta$$

where the function $E_\theta(\theta)$ is the overall dimensionless residence time distribution of the outlet fluid stream and $\theta$ is the dimensionless time.

The time-variant property of the fluid stream can vary randomly with time or alternatively can vary periodically with time. When the time-variant property of the fluid stream varies periodically with time, the enclosed volume can comprise a mixing zone and piping for dividing the inlet fluid stream into multiple fluid streams which are introduced into the mixing zone at multiple locations. The fluid in the mixing zone has a mean residence time defined as the volume of the mixing zone divided by the actual volumetric flow rate of the inlet fluid stream, and wherein this mean residence time is between about 0.3 and about 0.7 times the period of a cyclic time-variant property of the inlet fluid stream. The enclosed volume can include a mixing zone and piping for withdrawing fluid from the mixing vessel at multiple locations.

The fluid withdrawn from the mixing zone at multiple locations can be combined into an outlet fluid stream, wherein the mixing zone has a mean residence time defined as the volume of the mixing zone divided by the actual volumetric flow rate of the inlet fluid stream and wherein this mean residence time is between about 0.3 and about 0.7 times the period of a cyclic time-variant property of the inlet fluid stream.

The time-variant property of the inlet fluid stream can be selected from the group consisting of temperature, the concentration of a component in the stream, pH, thermal conductivity, electrical conductivity, viscosity, molecular weight, heat capacity, lower heating value, and higher heating value.

The inlet fluid stream can be a multicomponent gas mixture comprising hydrogen, methane and carbon dioxide, and the time-variant property of the inlet fluid stream can be the concentration of methane therein. This inlet fluid stream can comprise blowdown gas and purge effluent gas from a pressure swing adsorption process for removing at least methane and carbon dioxide from a mixture comprising at least hydrogen, methane, and carbon dioxide.

In another embodiment, the invention is a method for attenuating the amplitude of a time-variant property of a fluid stream which comprises dividing an inlet fluid stream having a time-variant property into three or more individual fluid streams, introducing each of the individual fluid streams into a mixing zone at a different entrance location in the zone, and withdrawing from an outlet location of the mixing zone an outlet fluid stream having a time-variant property amplitude which is attenuated relative to the amplitude of the time-variant property of the inlet fluid stream, wherein (1) at least first, second, and third individual fluid streams are withdrawn successively from the inlet fluid stream and introduced successively into the mixing zone at first, second, and third entrance locations, respectively, wherein the distances from the outlet location to the first, second, and third entrance locations increase respectively, and wherein the distance between the second and third entrance locations is less than the distance between the first and second entrance locations or (2) the flow rate of one of the individual fluid streams is different than the flow rate of another of the individual fluid streams, or (3) the flow rate of one of the individual fluid streams is different than the flow rate of another of the individual fluid streams and at least first, second, and third individual fluid streams are withdrawn successively from the inlet fluid stream and introduced successively into the mixing zone at first, second, and third entrance locations, respectively, wherein the distances from the outlet location to the first, second, and third entrance locations is less than the distance between the first and second entrance locations.

Another embodiment of the invention relates to a method for attenuating the amplitude of a time-varient property of a fluid stream which comprises (a) dividing an inlet fluid stream having a time-variant property into three or more individual fluid streams, introducing each of the individual fluid streams into a mixing zone at a different entrance location in the zone, and withdrawing from the mixing zone an outlet fluid stream having a time-varient property amplitude which is attenuated relative to the amplitude of the time-varient property of the inlet fluid stream, wherein (1) the distance between at least one pair of adjacent entrance locations is different than the distance between another pair of adjacent entrance locations, or (2) the flow rate of one of the individual fluid streams is different than the flow rate of another of the individual fluid streams, or (3) the distance between at least one pair of adjacent entrance locations if different than the distance between another pair of adjacent entrance locations and the flow rate of one of the individual fluid streams is different than the flow rate of another of the individual fluid streams; and (b) attenuating the amplitude of a time-variant property of the outlet fluid stream by dividing the outlet fluid stream into three or more additional individual fluid streams, introducing each of the additional individual fluid streams into an additional mixing zone at a different respective entrance location in the zone, and withdrawing from the additional mixing zone a second outlet fluid stream having a time-variant property of which the amplitude is further attenuated relative to the amplitude of the time-variant property of the outlet fluid stream, wherein in the additional mixing vessel (1) the distance between at least one pair of adjacent entrance locations is different than the distance between another pair of adjacent entrance locations, or (2) the flow rate of one of the individual fluid portions is different than the flow rate of another of the individual fluid portions, or (3) the distance between at least one pair of adjacent entrance locations is different than the distance between another pair of adjacent entrance locations and the flow rate of one of the individual fluid portions is different than the flow rate of another of the individual fluid portions.

Another variation of this embodiment can further comprise withdrawing one or more additional outlet fluid streams from the mixing zone, wherein the outlet fluid stream and the additional outlet fluid streams are withdrawn at different exit locations in the mixing zone, wherein (1) the distance between at least one pair of adjacent exit locations is different than the distance between another pair of adjacent exit locations, or (2) the flow rate of one of the outlet fluid streams is different than the flow rate of another of the outlet fluid streams, or (3) the distance between at least one pair of adjacent exit locations is different than the distance between another pair of adjacent exit locations and the flow rate of one of the outlet fluid streams is different than the flow rate of another of the outlet fluid streams.

In yet another embodiment, the invention is a method for attenuating the amplitude of a time-variant property of a fluid stream which comprises introducing into an inlet location in a mixing zone an inlet fluid stream having a time-variant property, withdrawing three or more individual fluid portions at different exit locations in the mixing zone, and combining the three or more individual fluid portions into a combined exit fluid stream having a time-variant property of which the amplitude is attenuated relative to the amplitude of the time-variant property of the inlet fluid stream, wherein (1) the distances between pairs of adjacent exit locations decrease as the distance between each adjacent exit location and the inlet location increase, or (2) the flow rate of one of the individual fluid portions is different than the flow rate of another of the individual fluid portions, or (3) the distances between pairs of adjacent exit locations decrease as the distances between each adjacent exit location and the inlet location increase and the flow rate of one of the individual fluid portions is different than the flow rate of another of the individual fluid portions.

Another embodiment of the invention relates to a method for attenuating the amplitude of a time-varient property of a fluid stream which comprises (a) introducing an inlet fluid stream having a time-variant property into a mixing zone, withdrawing three or more individual fluid portions at different exit locations in the mixing zone, and combining the three or more individual fluid portions into a combined exit fluid stream having a time-varient property of which the amplitude is attenuated relative to the amplitude of the time-variant property of the inlet fluid stream, wherein (1) the distance between at least one pair of adjacent exit locations is different than the distance between another pair of adjacent exit locations, or (2) the flow rate of one of the individual fluid portions is different than the flow rate of another of the individual fluid or portions, (3) the distance between at least one pair of adjacent exit locations is different than the distance between another pair of adjacent exit locations and the flow rate of one of the individual fluid portions is different than the flow rate of another of the individual fluid portions; and (b) introducing the combined exit fluid stream into an additional mixing zone, withdrawing three or more individual fluid portions at different exit locations in the mixing zone, and combining the three or more individual fluid portions into another combined exit fluid stream having a time-variant property of which the amplitude is attenuated relative to the amplitude of a time-variant property of the combined exit fluid stream, wherein (1) the distance between at least one pair of adjacent exit locations is different than the distance between another pair of adjacent exit locations, or (2) the flow rate of one of the individual fluid portions is different than the flow rate of another of the individual fluid portions, or (3) the distance between at least one pair of adjacent exit locations is different than the distance between another pair of adjacent exit locations and the flow rate of one of the individual fluid portions is different than the flow rate of another of the individual fluid portions.

In a further embodiment, the invention is a method for attenuating the amplitude of a time-variant property of a fluid which comprises introducing into a mixing zone two or more inlet fluid streams through two or more inlets and withdrawing two or more outlet fluid streams from the mixing zone through two or more outlets, with the provisos that (1) the number of inlet fluid streams and the number of outlet fluid streams cannot both equal one, and (2) the number of inlet fluid streams is at least three, or the number of outlet fluid streams is at least three, or the number of inlet fluid streams is at least three and the number of outlet fluid streams is at least three; wherein (a) the flow rate of one of the inlet fluid streams is different than the flow rate of another of the inlet fluid streams, or (b) the flow rate of one of the outlet fluid streams is different than the flow rate of another of the outlet fluid streams, or (c) the flow rate of one of the inlet fluid streams is different than the flow rate of another of the inlet fluid streams and the flow rate of one of the outlet fluid streams is different than the flow rate of another of the outlet fluid streams.

The invention also includes an apparatus for attenuating the amplitude of a time-variant property of a fluid stream which comprises an enclosed volume, wherein the enclosed volume includes (a) a mixing zone having three or more inlets and an outlet;

(b) piping means for dividing an inlet fluid stream into three or more individual fluid streams;

(c) piping means for introducing the three or more individual fluid streams respectively into the three or more inlets, and (d) piping means for withdrawing an outlet fluid stream from the outlet of the mixing zone;

wherein the distance between at least one pair of adjacent inlets is different than the distance between another pair of adjacent inlets.

This apparatus can further comprise piping means for withdrawing a portion of the fluid from the piping means of (b) and introducing it into the piping means of (d). In this apparatus, the mixing zone can be a mixing vessel characterized by an axis wherein the axial distance $D_n$ from any inlet to the outlet is defined by $$D_n = (d/N)\sum_{i=0}^{n-1}(N-i)$$

where n is an integer with a value of 1 through N, integers 1 through N denote sequential inlets, N is the total number of inlets to the mixing vessel, the inlet denoted by n=1 is the inlet nearest the outlet, the inlet denoted by n=N is the inlet farthest from the outlet, and d is the axial distance between the outlet and the inlet nearest the outlet.

This apparatus can further comprise another inlet located between the inlet denoted by n=1 and the outlet. The mixing vessel can be a cylinder with the outlet at either end of the cylinder, and the inlets can be arranged in a line parallel to the axis of the cylinder. The inlets can comprise openings of essentially the same cross sectional area, or alternatively can comprise openings of different cross sectional areas.

The invention includes another apparatus for attenuating the amplitude of a time-variant property of a fluid stream, which apparatus can comprise an enclosed volume, wherein the enclosed volume includes (a) a mixing zone having an inlet and three or more outlets;

(b) piping means for introducing an inlet fluid stream into the inlet of the mixing zone; and (c) piping means for withdrawing from the mixing zone three or more individual fluid portions through the three or more outlets and combining the three or more individual fluid portions into an outlet fluid stream;

wherein the distance between at least one pair of adjacent outlets is different than the distance between another pair of adjacent outlets.

This apparatus can further comprise piping means for withdrawing a portion of the fluid from the piping means of (b) and introducing it into the outlet fluid stream in the piping means of (c). The mixing zone can comprise a cylindrical volume which is characterized by an axis, wherein the axial distance $D_n$ from the inlet means to any outlet is defined by $$D_n = (d/N)\sum_{i=0}^{n-1}(N-i)$$

where n is an integer with a value of 1 through N, integers 1 through N denote sequential outlets, N is the total number of outlets from the mixing zone, the outlet denoted by n=1 is the outlet nearest the inlet, the outlet denoted by n=N is the outlet farthest from the inlet, and d is the axial distance between the inlet and the outlet nearest the inlet.

In this apparatus, the piping means of (c) can include means for withdrawing another individual fluid portion at a location between the outlet denoted by n=1 and the inlet means of (b). The mixing zone can comprise a cylindrical volume with the inlet means at either end of the cylindrical volume and the outlets arranged in a line parallel to the axis of the cylindrical volume. The outlets can comprise openings of essentially the same cross sectional area, or alternatively can comprise openings of different cross sectional areas.

The invention includes another apparatus for attenuating the amplitude of a time-variant property of a fluid, which apparatus can comprise an enclosed volume, wherein the enclosed volume includes (a) a mixing zone having one or more inlets and one or more outlets, with the provisos that (1) the number of inlets and the number of outlets cannot both equal one, and (2) the number of inlets is at least three, or the number of outlets is at least three, or the number of inlets is at least three and the number of outlets is at least three;

(b) piping means for conducting the fluid to the one or more inlets of the mixing zone;

(c) piping means for withdrawing fluid from the mixing zone through the one or more outlets and providing an outlet fluid stream;

wherein (1) the distance between at least one pair of adjacent inlets is different than the distance between another pair of adjacent inlets, (2) the distance between at least one pair of adjacent outlets is different than the distance between another pair of adjacent outlets, or (3) the distance between at least one pair of adjacent inlets is different than the distance between another pair of adjacent inlets and the distance between at least one pair of adjacent outlets is different than the distance between another pair of adjacent outlets.

Another embodiment of the invention includes a method for attenuating the amplitude of a time-variant property of a fluid stream which comprises dividing an inlet fluid stream having a time-variant property into three or more individual fluid streams, introducing each of the individual fluid streams into a mixing zone at a different entrance location in the zone, and withdrawing from the mixing zone an outlet fluid stream having a time-variant property amplitude which is attenuated relative to the amplitude of the time-variant property of the inlet fluid stream, wherein (a) the distance between at least one pair of adjacent entrance locations is different than the distance between another pair of adjacent entrance locations; or the flow rate of one of the individual fluid streams is different than the flow rate of another of the individual fluid streams; or the distance between at least one pair of adjacent entrance locations is different than the distance between another pair of adjacent entrance locations and the flow rate of one of the individual fluid streams is different than the flow rate of another of the individual fluid streams; and (b) the residence time distribution of the outlet fluid stream is characterized by a flatness constant $F_\theta$ equal to or less than about 0.11 and a symmetry constraint $S_\theta$ equal or less than about 0.075, wherein the flatness constraint $F_\theta$ is defined as $$F_\theta = \int_0^2 [0.5 - E_\theta(\theta)]^2 \, d\theta + \int_2^\infty [E_\theta(\theta)]^2 \, d\theta$$

and the symmetry constraint $S_\theta$ is defined as $$S_\theta = \int_0^1 [E_\theta(\theta) - E_\theta(2-\theta)]^2 \, d\theta + \int_2^\infty [E_\theta(\theta)]^2 \, d\theta$$

where the function $E_\theta(\theta)$ is the overall dimensionless residence time distribution of the outlet fluid stream and $\theta$ is the dimensionless time.

An alternative embodiment of the invention relates to a method for attenuating the amplitude of a time-variant property of a fluid stream which comprises introducing an inlet fluid stream having a time-variant property into a mixing zone, withdrawing three or more individual fluid portions at different exit locations in the mixing zone, and combining the three or more individual fluid portions into a combined exit fluid stream having a time-variant property of which the amplitude is attenuated relative to the amplitude of the time-variant property of the inlet fluid stream, wherein (a) the distance between at least one pair of adjacent exit locations is different than the distance between another pair of adjacent exit locations; or the flow rate of one of the individual fluid portions is different than the flow rate of another of the individual fluid portions; or the distance between at least one pair of adjacent exit locations is different than the distance between another pair of adjacent exit locations and the flow rate of one of the individual fluid portions is different than the flow rate of another of the individual fluid portions; and (b) the residence time distribution of the outlet fluid stream is characterized by a flatness constraint $F_\theta$ equal to or less than about 0.11 and a symmetry constraint $S_\theta$ equal or less than about 0.075, wherein the flatness constraint $F_\theta$ is defined as $$F_\theta = \int_0^2 [0.5 - E_\theta(\theta)]^2 \, d\theta + \int_2^\infty [E_\theta(\theta)]^2 \, d\theta$$

and the symmetry constraint $S_\theta$ is defined as $$S_\theta = \int_0^1 [E_\theta(\theta) - E_\theta(2-\theta)]^2 \, d\theta + \int_2^\infty [E_\theta(\theta)]^2 \, d\theta$$

where the function $E_\theta(\theta)$ is the overall dimensionless residence time distribution of the outlet fluid stream and $\theta$ is the dimensionless time.

BRIEF DESCRIPTION OF SEVERAL VIEWS OF THE DRAWINGS

FIG. 11 is a plot of dimensionless residence time distribution vs dimensionless time for the mixing vessel of FIG. 10.

FIG. 12 is a plot of the amplitude ratio vs relative residence time illustrating the attenuation of the amplitude of a sinusoidally-variant inlet fluid property by the mixing vessel of FIG. 10.

DETAILED DESCRIPTION OF THE INVENTION

Figure 1:
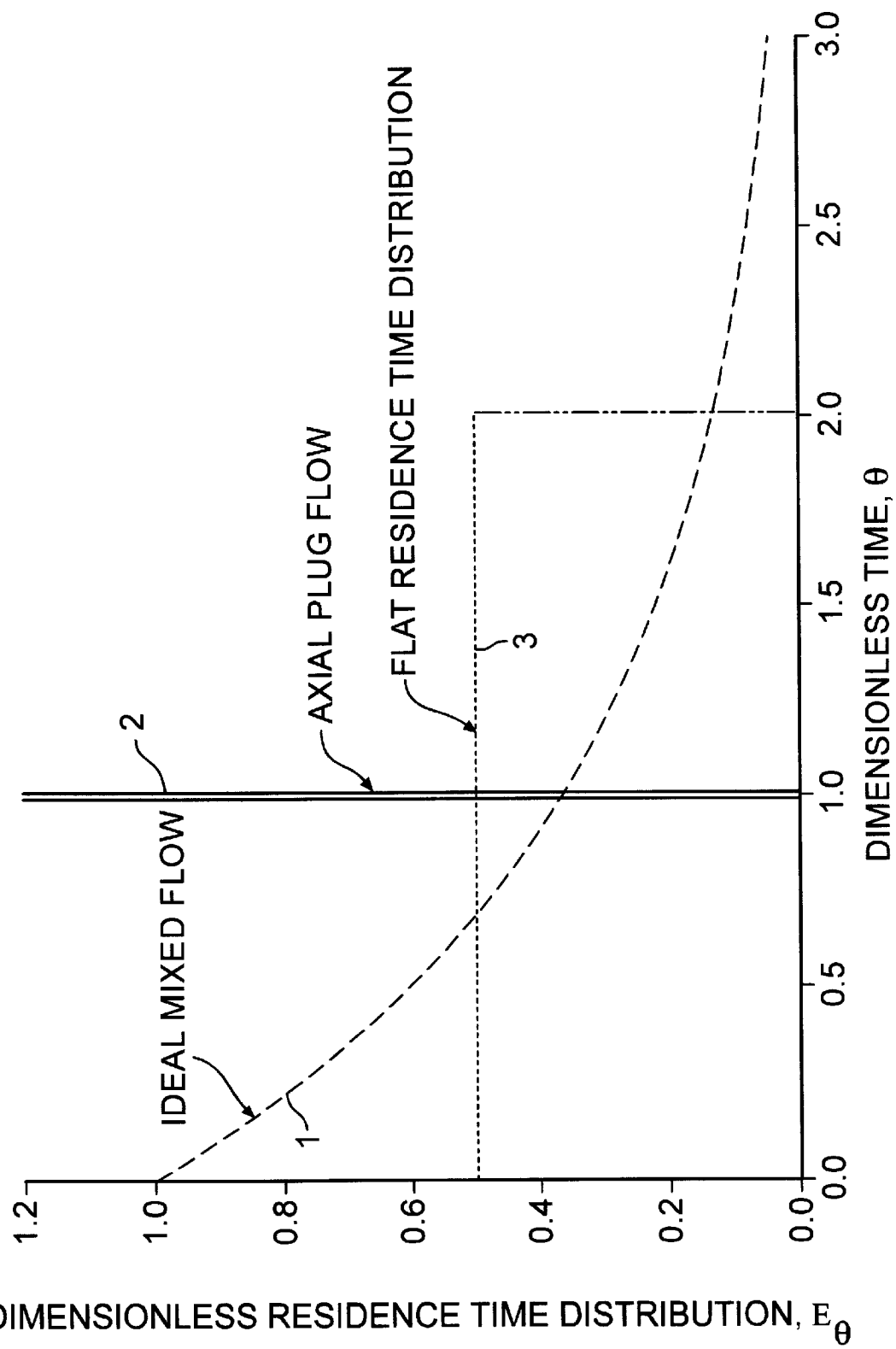
FIG. 1 is a plot of dimensionless residence time distribution vs dimensionless time for known mixing regimes and the preferred mixing regime of the present invention.

A fluid stream in a process can be a single-phase gas or liquid mixture, a multi-phase gas-liquid mixture (for example, an aerosol), a multi-phase liquid-liquid mixture (for example, an emulsion), or a multi-phase stream containing finely-divided solids suspended in a gas or a liquid. If the fluid stream properties vary with time, either randomly or periodically, the use of the stream in the process or in another process can be problematic. The present invention is a method to reduce or attenuate the amplitude of time-variant properties of a fluid stream by introducing the stream into a defined enclosed volume in a controlled manner such that the residence time distribution of the fluid exiting the enclosed volume approaches that of a preferred flat residence time distribution. This invention attenuates the amplitude of the time variance of the inlet stream more efficiently than known residence time distributions in defined volumes.

The terms "time-variant", "time-varying", "time-variable", "time variance", and "time variability" as applied to a fluid stream refer to a physical property or properties of the stream which vary or change with time. The time variance can be random, symmetrically cyclic, non-symmetrically cyclic, or combinations thereof, and this variance occurs about a mean or average value of the property defined over a long period of time. The terms "cyclic" and "periodic" can be used interchangeably and have equivalent meaning. The cycle time of a periodic time-variant property is defined as the regular interval in which the time-varying property occurs, reoccurs, or repeats itself. The maximum deviation of the property value from the mean over a given time period is defined as the amplitude of the deviation. An attenuated time-variant property is defined as a time-variant property in which the amplitude or variation of the property from a mean value has been decreased or attenuated relative to that of an initial time-variant property. In the present invention, the amplitude of a time-variant inlet stream property is reduced by passing the inlet stream through a specifically-designed vessel, from which is withdrawn a time-variant outlet stream property having a reduced amplitude.

Random variance of a process stream property can occur due to external and largely uncontrollable effects, for example, the effect of ambient atmospheric conditions on the operation of a given process. Symmetrically cyclic variance occurs in a regular repeatable pattern such as that described by a classic sine wave in which each half of a cycle is a mirror image of the other half. Non-symmetrically cyclic variance occurs in a repeatable pattern with time, but each half of a cycle is not a mirror image of the other half. In many processes, stream properties can exhibit combinations of random and cyclic behavior; for example, variance can be random over a short time period but cyclic over a longer time period. Cyclic stream property variations often occur in a process which consists of a series of discontinuous steps such as, for example, a pressure swing adsorption process used in gas separation.

The present invention can be applied to any of the fluid streams described above which possess any of the described types of time variance in stream properties. Most applications will be found, however, for streams which exhibit some type of periodic or cyclic variance in stream properties.

A stream property is defined as any measurable physical property or attribute of a stream. Examples of stream properties include temperature, composition, pH, thermal conductivity, electrical conductivity, viscosity, specific gravity, heat capacity, chemical potential, molecular weight, and heating value. Other properties can be envisioned which would be included in these examples.

The amplitude of a time-variant property of a fluid stream can be attenuated by known methods in which the fluid stream flows through a holding volume or mixing zone which is mixed to promote a uniform value of the property of interest. Mixing can be effected by naturally occurring phenomena such as convection and diffusion, and mixing can be promoted by mechanical agitators, by inlet distributors or jets which utilize pressure drop to promote mixing, or by baffles which promote turbulence. This develops a residence time distribution in which elements of fluid remain in the holding volume or mixing zone for different periods of time. This well known phenomenon is described in the textbook entitled *Chemical Reaction Engineering,* Second Edition, by O. Levenspiel (John Wiley and Sons, 1972). The following discussion follows Levenspiel's terminology.

The residence time distribution of a fluid flowing through a vessel or an enclosed volume can be described by a function defined as the exit age distribution or exit residence time distribution, E(t), of the fluid leaving the enclosed volume where t is the time spent by an element of fluid in the enclosed volume. This exit residence time distribution is conveniently normalized by the expression $$\int_0^\infty E(t)dt = 1 \qquad \text{(eq. 1)}$$

A plot of E vs. t then describes the time distribution of all elements of the fluid in the stream exiting the enclosed volume. The term "residence time distribution" as used herein is equivalent to the exit residence time distribution defined above.

E can be evaluated for any volume and flow rate by a number of experimental or theoretical techniques known as stimulus-response techniques. In such methods, the system is disturbed and its response is recorded as a function of time. The resulting response then can be analyzed to obtain the residence time distribution function. The two most common stimuli are a pulse input and a step input. Procedures for calculating the residence time distribution of arbitrary volumes are described in standard reaction engineering texts such as that of Levenspiel cited above.

In the context of the present invention, a preferred method to determine residence time distribution using a step input stimulus is as follows:

1) Operate an enclosed volume at steady state conditions which are as close as possible to the time-averaged values of the time-variant fluid stream properties, including composition, temperature, pressure, and mass flow rate.

2) Suddenly introduce a tracer material into the inlet stream to the enclosed volume in a manner which approaches a step input. The introduction of the tracer material should not affect the flow pattern or fluid properties inside the enclosed volume to any significant degree. To ensure that the tracer material does not affect the flow pattern or fluid properties, the maximum concentration of tracer material inside the enclosed volume should be minimized and the fluid properties of the tracer material should be preferably identical or similar to those used in the operation of the enclosed volume.

3) Record the tracer concentration in the outlet stream of the enclosed volume as a function of time. The concentration value should be recorded frequently enough to ensure that accurate differentiation of the values with time can be performed. Preferably, the concentration should be recorded at time intervals at least 100 times smaller than the mean residence time of the fluid in the enclosed volume.

4) The tracer concentration in the outlet stream of the enclosed volume is numerically differentiated with time to obtain the residence time distribution E. The numerical differentiation can be performed using known techniques as described in standard numerical methods textbooks (see for example *Numerical Methods for Engineers,* Second Edition, by S. Chapra and R. Canale, McGraw-Hill, 1988).

Once the residence time distribution has been determined for the enclosed volume, a number of calculations can be performed that quantify the degree of mixing in the volume. The mean value or centroid of the distribution E can be determined using eq. 2.

$$\bar{t} = \int_0^\infty t E \, dt \qquad \text{(eq. 2)}$$

Here, $\bar{t}$ is the mean residence time of the fluid in the enclosed volume. The mean residence time $\bar{t}$ also can be calculated from the total enclosed volume, V, and the actual volumetric flow rate, v, which exits the volume V, by eq. 3.

$$\bar{t} = \frac{V}{v} \qquad \text{(eq. 3)}$$

If the actual volumetric flow rate from volume V is essentially constant, this value of the flow rate is used for v in eq. 3. If the actual volumetric flow rate varies with time, the time-averaged actual volumetric flow rate is used for v in eq. 3.

The most useful feature of the residence time distribution function is that the time-variant outlet fluid property can be calculated as a function of the time-variant inlet fluid property. In particular, the outlet fluid property $C_{out}$ can be calculated from a convolution integral of the time-dependent inlet property, $C_{in}$, and the residence time distribution function, E, as given by eq. 4.

$$C_{out}(t) = \int_0^t C_{in}(t - t') E(t') \, dt' \qquad \text{(eq. 4)}$$

Here, t' is the variable of integration and the values of the inlet and outlet fluid properties, $C_{in}$ and $C_{out}$, are taken to be the spatial average of the property across the cross sectional area of the given inlet or outlet pipe. Mathematically this can be described by $$C_{in} \text{ or } C_{out} = \frac{\left[\int_A C(x) \, dA\right]}{[\int_A dA]} \qquad \text{(eq. 5)}$$

where C(x) is the fluid property as a function of position at either the inlet or the outlet and A is the cross-sectional area of either the inlet or the outlet. Note that, with this definition, the residence time distribution is well-defined even if a given fluid property is not uniform across the entire cross section of either the inlet or outlet pipe.

When describing the residence time distribution of an enclosed volume, it is often convenient to use dimensionless quantities. A nondimensional time and a nondimensional exit residence time distribution function can be defined as given by eq. 6 and eq. 7.

$$\theta = \frac{t}{\bar{t}} \qquad \text{(eq. 6)}$$

$$E_\theta = \bar{t} E \qquad \text{(eq. 7)}$$

where $\bar{t}$ is the mean residence time of the fluid in the enclosed volume as given by eq. 2.

The concept of the present invention can be illustrated utilizing the residence time distribution theory described above as applied in FIG. 1, which is a plot of the dimensionless residence time distribution parameters $E_\theta$ vs $\theta$. Curve 1 is a plot of these variables for ideal mixed flow, which represents a flow regime in which the flow through an enclosed volume is perfectly mixed. This exists in theory only, since a real enclosed volume is seldom perfectly mixed. Curve 1 for ideal mixed flow illustrates a broad range of dimensionless residence times from very short to very long, with the mean occurring at $\theta=1$, which is the mean residence time of the enclosed volume by definition. The area under Curve 1 integrated from zero to infinity is 1 by definition and the area under the curve has its centroid at $\theta=1$. The mixing regime of ideal mixed flow typically attenuates the amplitude of a time-variant fluid property of the inlet stream by promoting convection in the volume by means of mechanical agitation. The goal of this mechanical agitation is to minimize spatial gradients of the fluid property in the enclosed volume.

Curve 2 in FIG. 1 illustrates the other extreme of possible mixing regimes, which is axial plug flow. This represents flow through an enclosed volume in which there is no mixing, and therefore there is no distribution of residence times since all elements of fluid spend the same time in the enclosed volume flowing between the inlet and outlet. This exists in theory only, since a real enclosed volume exhibits some distribution of residence times. The common dimensionless residence time is 1, as in ideal mixed fluid discussed above. Since there is no distribution of residence times in an axial plug flow regime, it has no utility for the attenuation of time-variant properties in the inlet stream as discussed below.

In the development of the present invention, it was realized that a more favorable residence time distribution for the attenuation of the amplitude of inlet time-variant fluid properties would be desirable and could lead to more efficient attenuation of these properties compared with known methods. The principle of the invention is defined as a flat residence time distribution, which is illustrated by curve 3 in FIG. 1. Such a distribution exhibits a constant exit age or exit residence time distribution in the exit fluid stream from the enclosed volume compared with the exponential decay type distribution exhibited by the ideal mixed flow case of curve 1. The flat residence time distribution is ideal and may not be achievable by flow in a real enclosed volume. However, the design of a flow volume which approaches a flat residence time distribution offers an improved means of attenuating the amplitude of time-variant inlet fluid properties compared with an enclosed volume which approaches that of ideal mixed flow.

The flat residence time distribution curve 3 of FIG. 1 is defined in part by the feature that the area under the curve integrated from zero to infinity is 1, by definition, and the centroid of the area under the curve is located at $\theta=1$, as in the ideal mixed flow and axial plug flow cases above. However, a distinguishing feature of the flat residence time distribution curve is that $E_\theta$ has a value of 0.5 between the dimensionless times of zero and two, and has a value of zero for all dimensionless times greater than two.

The residence time distributions shown in FIG. 1 arise when different types of mixing are either promoted or inhibited. Ideal mixed flow arises when a type of mixing called spatial mixing is promoted. With spatial mixing, uniformity of a given fluid property throughout the mixing volume is desired. Uniformity throughout the volume can be promoted by mechanical agitation methods, baffles, or the use of high-velocity fluid jets to increase convective mass transfer. In contrast, axial plug flow occurs when spatial mixing is inhibited within the volume so that each portion of fluid exits the volume exactly one mean residence time after entering the volume. Spatial mixing can be inhibited by eliminating flow nonuniformities, backmixing and turbulent eddies. Both the spatial uniformity associated with ideal mixed flow and the narrow residence time distribution associated with axial plug flow have been used advantageously for chemical reaction systems (see Levenspiel cited above).

In the development of the present invention, it was realized that improved attenuation of time-variant fluid properties can be realized using a new type of mixing characterized by the flat residence time distribution described above. This new type of mixing is defined as temporal mixing. In temporal mixing, uniformity of the fluid property throughout the mixing volume is unimportant; instead, the objective is to ensure that each portion of fluid entering the mixing volume has an equal probability of exiting the mixing volume at any time between the time it enters and two mean residence times of the mixing volume later, i.e., between $\theta=0$ and $\theta=2$ in FIG. 1. When temporal mixing is promoted in a mixing volume, the flat residence time distribution shown in FIG. 1 is approached.

The preferred flat residence time distribution of the present invention is very efficient at attenuating the amplitude of time-variant inlet fluid properties because of the constant age distribution in the exit fluid stream. In order to create a desirable flat residence time distribution for a volume, the present invention includes various configurations which introduce different portions of the fluid stream into the mixing zone at different locations, or withdraw portions of the fluid from the mixing zone at different locations, such that each fluid element experiences a different residence time as it proceeds through the mixing zone. The different residence times are induced by introducing fluid or withdrawing fluid at different locations in the mixing zone. Ideally and preferably, no fluid element exits with a dimensionless residence time $\theta$ of greater than 2.

In order to illustrate the utility of the three mixing regimes described above for attenuating the amplitude of a sinusoidal time-variant inlet stream property, calculations were carried out using a time-variant inlet stream property with an amplitude of A and a range of cycle times, $t_{cyc}$. Eq. 4 described above was utilized for the calculations and a volume with a mean fluid residence time of $\bar{t}$ was used for all of the mixing regimes. The degree of attenuation is defined as the ratio of the outlet amplitude to the inlet amplitude of the time-variant stream property, which means by definition that the value of this ratio is zero for complete attenuation and one for no attenuation. This amplitude ratio is plotted as a function of the dimensionless ratio $\bar{t}/t_{cyc}$ in FIG. 2 for the ideal mixed flow, axial plug flow, and flat residence time distribution regimes discussed above.

The dimensionless ratio $\bar{t}/t_{cyc}$ reflects the particular parameters of a system (V, the volume; v, the fluid volumetric flow rate; and $t_{cyc}$, the cycle time of the time-variant fluid property). A major objective of the present invention is to minimize the amplitude ratio for given values of $\bar{t}/t_{cyc}$, particularly for those values greater than about 0.3.

Figure 2:
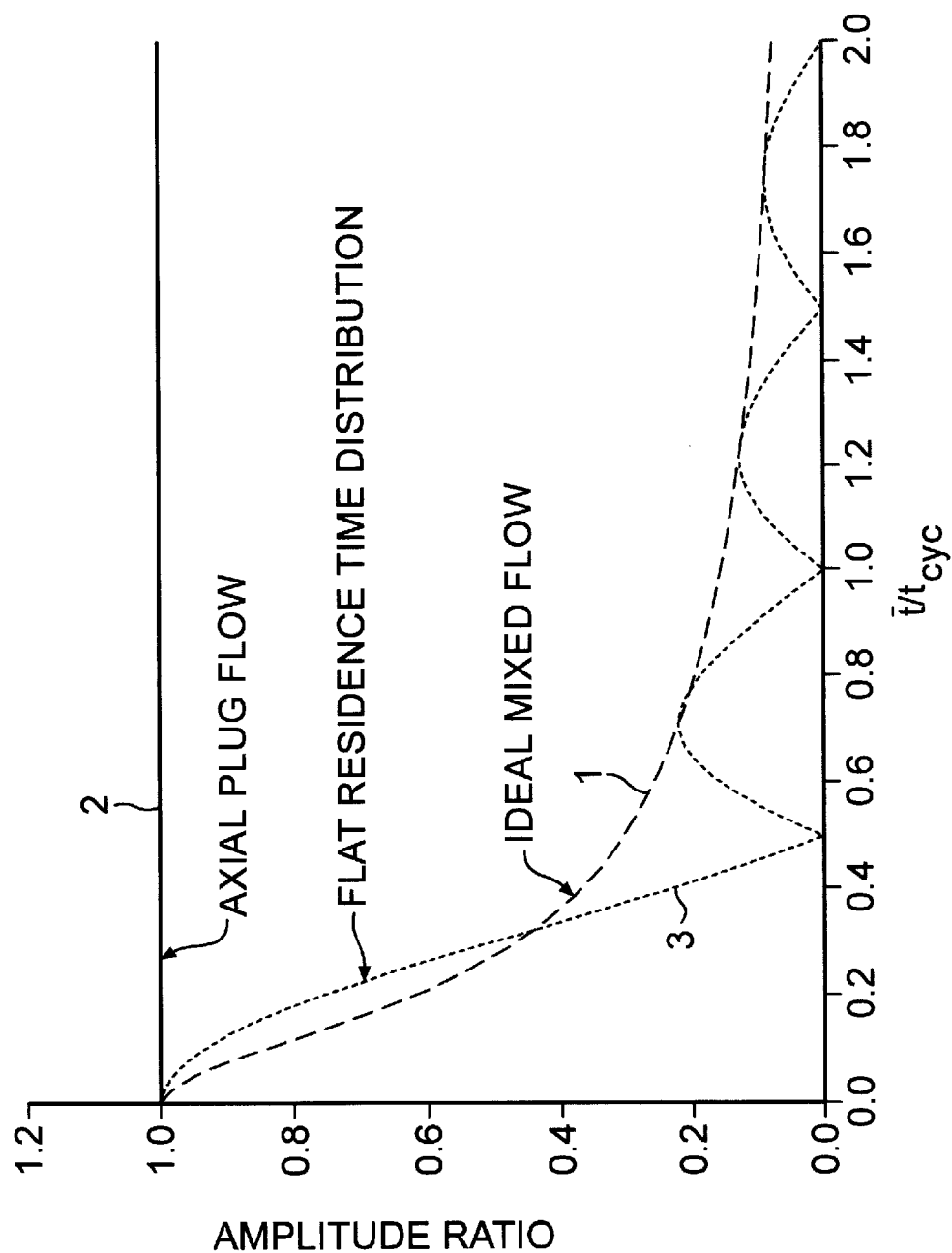
FIG. 2 is a plot of amplitude ratio vs relative residence time illustrating the attenuation of the amplitude of a sinusoidally-variant inlet fluid property by known mixing regimes and the preferred mixing regime of the present invention.

Curve 2 of FIG. 2 is the response for the axial plug flow residence time distribution. The amplitude ratio is constant at a value of 1 for all values of $\bar{t}/t_{cyc}$, which indicates that the amplitude of the time-variant outlet property is equal to the amplitude of the time-variant inlet property, and thus there is no attenuation of the amplitude of the time-variant inlet property. This is to be expected, since this mixing regime does not attenuate the inlet stream variations. Curve 1 of FIG. 2 shows the attenuation provided by the ideal mixed flow residence time distribution in which the amplitude ratio decreases monotonically as $\bar{t}/t_{cyc}$ increases. In practical terms, as $\bar{t}/t_{cyc}$ increases (i.e. as the size of the mixing volume increases relative to the cycle time of the cyclic inlet time-variant property), the amplitude ratio decreases and attenuation becomes more effective.

The response calculated for the flat residence time distribution is shown by curve 3 of FIG. 2. At values of $\bar{t}/t_{cyc}$ greater than about 0.3, the amplitude ratio is consistently less than that of the other two residence time distributions, and is actually equal to zero for certain values of $\bar{t}/t_{cyc}$ (0.5, 1.0, 1.5, etc.). Since an amplitude ratio of zero means that the outlet stream fluid properties do not vary with time, the ideal flat residence time distribution can completely eliminate fluid property fluctuations for certain conditions in a finite volume.

The response curves shown in FIG. 2 are derived for the ideal residence time distributions for the three mixing regimes shown in FIG. 1. In actual fluid mixing situations, the residence time distributions of FIG. 1 will be different, and the response curves of FIG. 2 also will be different. Examples closer to actual fluid flow situations are given below.

While the data in FIG. 2 were prepared for a sinusoidal time variance of the inlet fluid property, the same approach can be used to predict the attenuation of the amplitude of any other type of periodic time variance of the inlet fluid property. To accomplish this, the variance of the inlet fluid property with time is treated mathematically as an inlet signal. A Fourier transform of the inlet signal yields a series of sinusoidal signals which, when summed, gives the original signal. Each member or mode of the summation series then can be utilized to determine the amplitude ratio for a hypothetical time-variant fluid flowing through an enclosed volume. For a signal of arbitrary shape and $\bar{t}/t_{cyc}=0.5$, the Fourier components will be nonzero only for $\bar{t}/t_{cyc}=0.5, 1.0, 1.5$, etc. From FIG. 2, the amplitude ratio for each Fourier mode would thus be equal to zero. Therefore, an enclosed volume with a flat residence time distribution will completely eliminate the fluctuations in each mode of the inlet signal for $\bar{t}/t_{cyc}=0.5$, regardless of the actual shape of the inlet signal.

Because of the complete elimination of cyclic inlet fluid stream property fluctuations, an enclosed volume which exhibits a flat residence time distribution is uniquely effective at reducing time varying fluid properties. Also, for an enclosed volume which exhibits an inlet $\bar{t}/t_{cyc}$ close to 0.5, 1.0, 1.5, etc, the fluctuations will be reduced much more by an enclosed volume which exhibits a flat residence time distribution than by an enclosed volume that exhibits an ideally mixed fluid residence time distribution.

The flat residence time distribution also yields good attenuation when the inlet fluid property is not periodic. In the following discussion, the variance of the inlet fluid property with time also can be defined as an inlet signal. In some situations, the inlet signal can be characterized as a single pulse or a series of pulses. For a pulse input, the output signal is identical in shape to the residence time distribution. The maximum deviation of the outlet signal is equal to the maximum value of the residence time distribution. Therefore, a flat residence time distribution will exhibit the smallest deviation from steady state behavior, while the ideal mixed flow residence time distribution and axial plug flow residence time distribution result in much higher deviations from steady state behavior.

While a flat residence time distribution can achieve superior signal attenuation for a given enclosed volume, an ideal flat residence time distribution is only a theoretical concept, and under real conditions can only be approached. The existence of diffusion, non-uniform velocity profiles, and other natural forces in an enclosed volume makes it difficult to achieve an ideal flat residence time distribution. In the present invention, it was found that enclosed volumes with residence time distributions which approach an ideal flat residence time distribution can be developed which exhibit superior temporal mixing performance over known methods. It was found that two mathematical constraints describe residence time distributions which sufficiently approach a flat residence time distribution and achieve superior mixing performance over known methods. These constraints define the preferred operating region of the present invention.

The first constraint is defined as a flatness constraint which measures the deviation of a given residence time distribution from the ideal flat residence time distribution shown in FIG. 1. The flatness constraint $F_\theta$ is defined as $$F_\theta = \int_0^2 [0.5 - E_\theta(\theta)]^2 \, d\theta + \int_2^\infty [E_\theta(\theta)]^2 \, d\theta \quad \text{(eq. 8)}$$

where the function $E_\theta(\theta)$ is the overall dimensionless residence time distribution of the fluid exiting the enclosed volume as defined above. As seen in FIG. 1, an ideal flat residence time distribution exhibits a nondimensional value of 0.5 between a nondimensional time $\theta$ of zero and 2 and exhibits a nondimensional value of zero for all nondimensional times greater than 2. As a residence time distribution approaches an ideal flat residence time distribution, the value of the flatness constraint $F_\theta$ defined by eq. 8 approaches zero, and as the residence time distribution deviates from an ideal flat residence time distribution, the value of the flatness constraint $F_\theta$ becomes larger than zero. In the present invention, deviation from the ideal flat residence time distribution is acceptable as long as the value of the flatness constraint $F_\theta$ is equal to or less than about 0.11.

Several known residence time distributions have been found to meet the above flatness constraint (i.e. they are nearly flat) but none of them performs good attenuation of the amplitude of time-varying fluid properties. It also was found that a residence time distribution which meets the above constraint performs good attenuation only when the residence time distribution also is nearly symmetrical around a nondimensional time, $\theta$, of one. It was found that superior performance is achieved for residence time distributions which approach a flat residence time distribution according to the flatness constraint, and in addition, are also nearly symmetrical about a nondimensional time of one, i.e., $\theta=1$. This symmetry constraint is defined as $$S_\theta = \int_0^1 [E_\theta(\theta) - E_\theta(2-\theta)]^2 \, d\theta + \int_2^\infty [E_\theta(\theta)]^2 \, d\theta \quad \text{(eq. 9)}$$

where, as above, the function $E_\theta(\theta)$ is the overall dimensionless residence time distribution of the fluid exiting the volume. The symmetry constraint $S_\theta$ is equal to zero for any residence time distribution which is symmetrical around a dimensionless time of one and zero for any dimensionless time greater than two. Since the ideal flat residence time distribution meets these two requirements, $S_\theta$ is equal to zero for an ideal flat residence time distribution. Deviations from zero occur as either of the two terms in the integral of eq. 9 begins to deviate from zero. The first term is nonzero if a residence time distribution is not symmetrical for $\theta$ between 0 and 2. The second term is nonzero if the residence time distribution itself is nonzero for $\theta$ greater than 2. In the present invention, deviation from the ideal flat residence time distribution is acceptable as long as value of the symmetry constraint $S_\theta$ is equal to or less than about 0.075.

It was found that enclosed volumes with an overall residence time distribution which meet these two constraints perform significantly better than known methods for the attenuation of the amplitude of time varying fluid properties. In order to achieve good attenuation performance, a given enclosed volume must have a residence time distribution which is reasonably close to a flat residence time distribution as defined above, wherein $F_\theta$ is equal to or less than about 0.11 and $S_\theta$ is equal or less than about 0.075. Deviations from the ideal flat residence time distribution can be tolerated as long as the residence time distribution is reasonably symmetrical about the mean residence time ($\theta=1$) and a minimal amount of fluid resides in the volume for a time greater than twice the mean residence time. Based on this understanding of the manner in which residence time distributions can deviate from the ideal flat residence time distribution, a number of specific mixing volumes have been developed which give very good attenuation of the amplitude of time varying stream fluid properties.

The scope of the present invention includes fluids which have essentially constant flow rates as well as fluids with time-varying flow rates. In the latter case, as discussed earlier, a varying flow rate is time-averaged and this time-averaged value is used in the determination of the exit residence time distribution. The flatness constraint $F_\theta$ and the symmetry constraint $S_\theta$ are then based on a time-averaged fluid flow rate.

The preferred flat residence time distribution of the invention can be approached by introducing fluid into an enclosed volume in which the fluid is directed within a mixing zone by introducing the fluid into the zone through specifically-placed inlets or by withdrawing fluid from the zone through specifically-placed outlets. A piping manifold is used to introduce or withdraw fluid from multiple inlets or outlets of the mixing zone. The enclosed volume by definition includes the mixing zone, the required piping manifold, and the corresponding inlet or outlet piping, and an inlet distributor which may be required. This is illustrated in the embodiments described below.

In one embodiment, the fluid is introduced into the mixing zone through a plurality of specifically-spaced inlets and withdrawn from the mixing zone through one or more outlets, wherein the number of inlets is greater than the number of outlets. Typically, three or more inlets are used and one outlet is used. The multiple inlets to the mixing zone are located such that the distance between at least one pair of adjacent inlets is different than the distance between another pair of adjacent inlets. Preferably, the cross sectional areas of the inlets are sized such that the flow rates through the inlets are essentially the same, i.e., the flow rate through each inlet is within ±2% of the total inlet flow to the enclosed volume divided by the number of inlets to the mixing zone. The spacing of the inlets is carefully selected, as explained later, such that the residence times of the portions of fluid introduced into the mixing vessel through the multiple inlets into the mixing zone are different. The distribution of these different residence times approaches the desired flat exit residence time distribution of the total outlet stream.

In another embodiment, the fluid is introduced into the mixing zone through one or more inlets and withdrawn from the zone through a plurality of specifically-spaced outlets, wherein the number of outlets is greater than the number of inlets. Typically, one inlet is used and three or more outlets are used. The multiple outlets from the mixing zone are located such that the distance between at least one pair of adjacent outlets is different than the distance between another pair of adjacent outlets. Preferably, the cross sectional areas of the outlets are sized such that the flow rates through the outlets are essentially the same, i.e., the flow rate through each outlet is within ±2% of the total outlet flow to the mixing vessel divided by the number of outlets. The spacing of the outlets is carefully selected, as explained later, such that the residence times of the portions of fluid introduced through the inlet into the mixing zone and withdrawn from the multiple outlets thereof are all different. The desired distribution of these different residence times in the total outlet stream from the enclosed volume, i.e. in the combined stream from the multiple outlets of the mixing zone, approaches the preferred flat residence time distribution.

In another embodiment, one inlet can be used with multiple outlets which have different sizes or cross sectional areas, which results in a different flow rate through each outlet. The outlet sizes or cross sectional areas are selected to yield a desired fluid residence time distribution of the combined outlet stream which approaches the preferred flat residence time distribution.

In yet another embodiment, one outlet can be used with multiple inlets. The inlets can have different sizes or cross sectional areas, which results in a different flow rate through each inlet. The inlet sizes or cross sectional areas are selected to yield a desired fluid residence time distribution of the outlet stream which approaches the preferred flat residence time distribution.

In the broadest concept of the invention, any combination of multiple inlet spacings and fluid flow rates can be used with one or more outlets, and/or any combination of multiple outlet spacings and fluid flow rates can be used with one or more inlets, in order to give a fluid residence time distribution in the total outlet stream from the enclosed volume which approaches the preferred flat residence time distribution.

The common characteristic of all embodiments of the present invention is that different residence times are imparted to the time-variant fluid by physically dividing the fluid into individual portions, each of which has a different residence time while passing through the mixing zone. The mixing zone is part of the enclosed volume as defined herein, and the fluid is directed within the enclosed volume so that the fluid residence time distribution in the total outlet stream from the enclosed volume approaches the preferred flat residence time distribution.

The desired fluid portions can be created by selecting the number of and spacing between the multiple inlets and/or the number of and spacing between the multiple outlets, and by selecting the flow rates of the fluid flowing through the multiple inlets and/or multiple outlets. The fluid flow rates through inlets and outlets can be controlled by any known method including fixing the size of each inlet and outlet line, installing flow restricting orifices in the inlet and outlet piping, or by using flow control valves in the inlet and outlet piping.

The use of multiple inlets and/or outlets of the present invention differs from the known method of mixing a time-variant stream in a mixing zone in which a single inlet and a single outlet are used as in the ideal mixed fluid described above.

Figure 3:
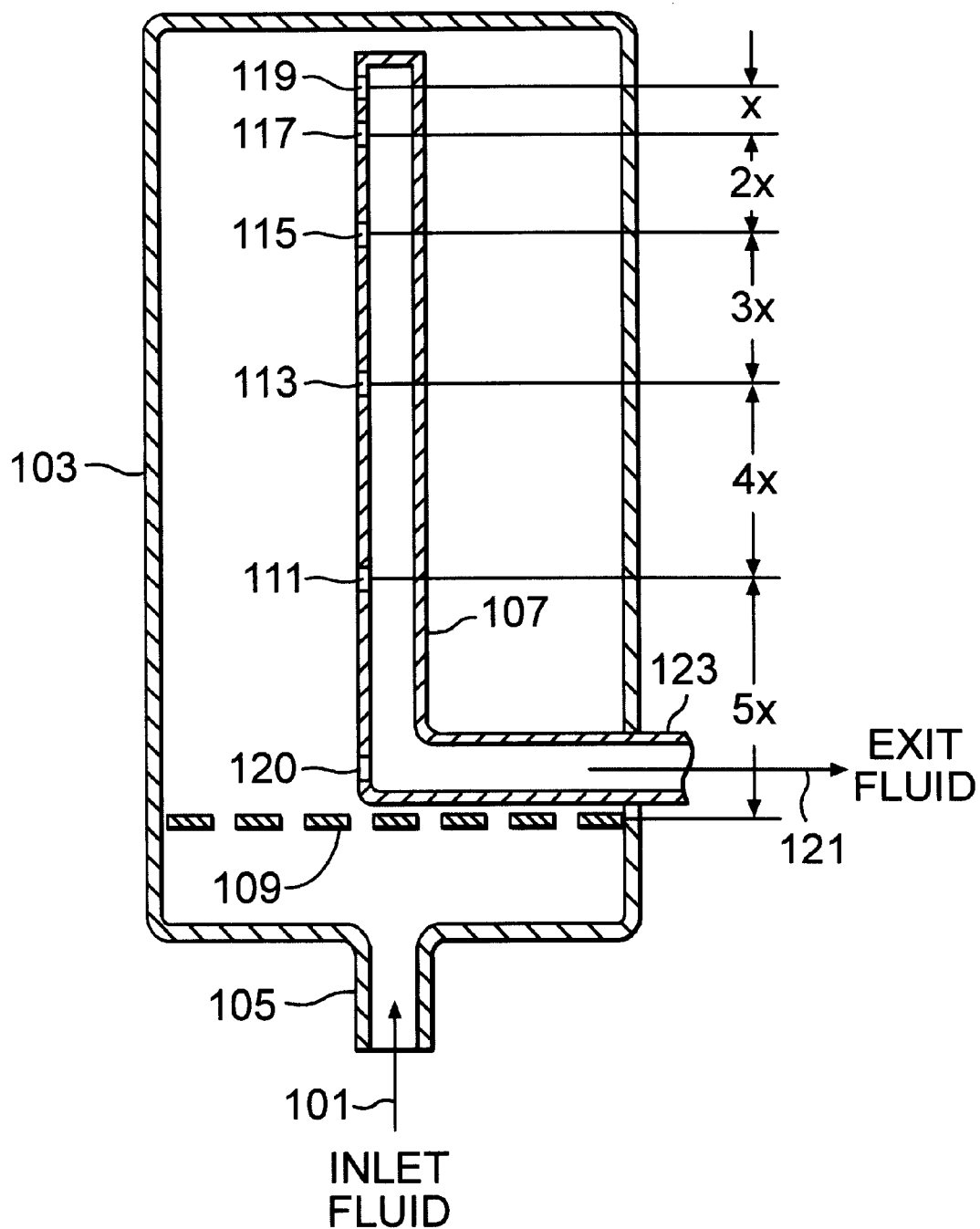
FIG. 3 is a schematic drawing of a mixing vessel according to an embodiment of the present invention.

A first embodiment of the invention is illustrated in FIG. 3. Fluid stream 101, which may contain any number of components and which has a time-varying fluctuation of a fluid property such as concentration, is introduced into vessel 103 via entrance 105. Vessel 103 is preferably cylindrical and is fitted with a centrally mounted exit manifold 107. Optionally and preferably, inlet distributor 109 is installed to promote axial plug flow upward through the vessel. Exit manifold 107 has five outlet holes 111, 113, 115, 117, and 119 along its axial length and each hole has a different diameter such that one-fifth of the total flow of inlet fluid stream 101 enters exit manifold 107 through each hole. Optionally, additional hole 120 is utilized wherein hole 120 is as close as possible to inlet distributor 109. In this option, there are six holes and each hole has a different diameter such that one-sixth of the total flow of inlet fluid stream 101 enters exit manifold 107 through each hole.

The mixing zone or temporal mixing zone in FIG. 3 is that volume within vessel 103 bounded by distributor 109, the inner walls of vessel 103 above distributor 109, and the inner walls of exit manifold 107 above outlet 111 or above outlet 120 if used. The enclosed volume of FIG. 3 is the entire volume between inlet 105 and outlet 123.

The preferred spacing of the five outlet holes along the length of exit manifold 107 in this embodiment is as follows. The axial distance from the top hole 119 to the adjacent hole 117 along the length of the exit manifold 107 is designated generically as x. The axial distance between holes 117 and 115 is 2x, between holes 115 and 113 is 3x, between holes 113 and 111 is 4x, and between hole 111 and inlet distributor 109 is 5x. Thus the total axial distance from outlet hole 119 to the inlet distributor 109 is 15x. In the embodiment of FIG. 3, hole 119 should be located as close as possible to the top of vessel 103.

In general terms, the axial distance $D_n$ from inlet distributor 109, or from any other inlet means, to any outlet for a vessel having a constant cross sectional area perpendicular to the flow direction is defined by $$D_n = (d/N) \sum_{i=0}^{n-1} (N-i) \qquad \text{eq. 10}$$

where n is an integer with a value of 1 through N, integers 1 through N denote sequential outlets, N is the total number of outlets from the mixing zone, the outlet denoted by n=1 is the outlet nearest the inlet, the outlet denoted by n=N is the outlet farthest from the inlet, and d is the axial distance between the inlet and the outlet nearest the inlet. This definition excludes optional outlet hole 120.

In an alternative embodiment, any of holes 111 through 120 in manifold 107 can be replaced with a group of smaller holes at essentially the same axial location. In this embodiment, the total open area or cross sectional area of the plurality of small holes is equivalent to the open area or cross sectional area of the hole. In the most general terms, the term "outlet" means a hole or group of holes which are essentially the same axial distance from the inlet. Fluid exits the mixing zone through the outlet which comprises the hole or group of holes.

The specific spacing between the holes in exit manifold 107 is determined so that as the fluid flows upward in the temporal mixing zone, the mean residence time of the fluid between each adjacent hole is essentially the same. The mixing vessel 103 is designed so that temporal mixing is promoted as the fluid passes through the temporal mixing zone and outlet manifold 107. Preferably, the fluid flows through the temporal mixing zone in axial plug flow with a minimum of spatial mixing caused by convection and diffusion.

The performance of the temporal mixing zone in vessel 103 can be characterized mathematically by assuming dispersed plug flow of the fluid as it flows upward through the zone. The amount of axial dispersivity that occurs can be determined by using standard correlations presented in the Levenspiel textbook cited earlier. It will be assumed further that the fluid residence time in the exit manifold 107 is negligible compared to the fluid residence time in the temporal mixing zone of vessel 103. With these assumptions, the equations governing the temporal performance of the temporal mixing zone of vessel 103 can be formulated and solved to give the time-variant fluctuations of the fluid property of exit stream 121 from exit 123 for a given time-variant inlet property fluctuation in inlet stream 101. Specific time-variant inlet and outlet fluctuations can be analyzed to determine the theoretical residence time distribution of the temporal mixing zone in vessel 103.

The first step in determining the residence time distribution of the temporal mixing zone of vessel 103 is to introduce a step change in the time-variant fluid property of inlet stream 101 and record the resultant change in the same fluid property as it leaves vessel 103 via exit 123 as exit stream 121. By assuming that the inlet fluid property of inlet stream 101 increases from a value of 0 to a value of 1 at a time of 0, the value of the particular fluid property in exit stream 121 can be calculated using the equations referenced above. This calculation yields the plot of relative concentration in exit stream 121 vs time given in FIG. 4.

Figure 4:
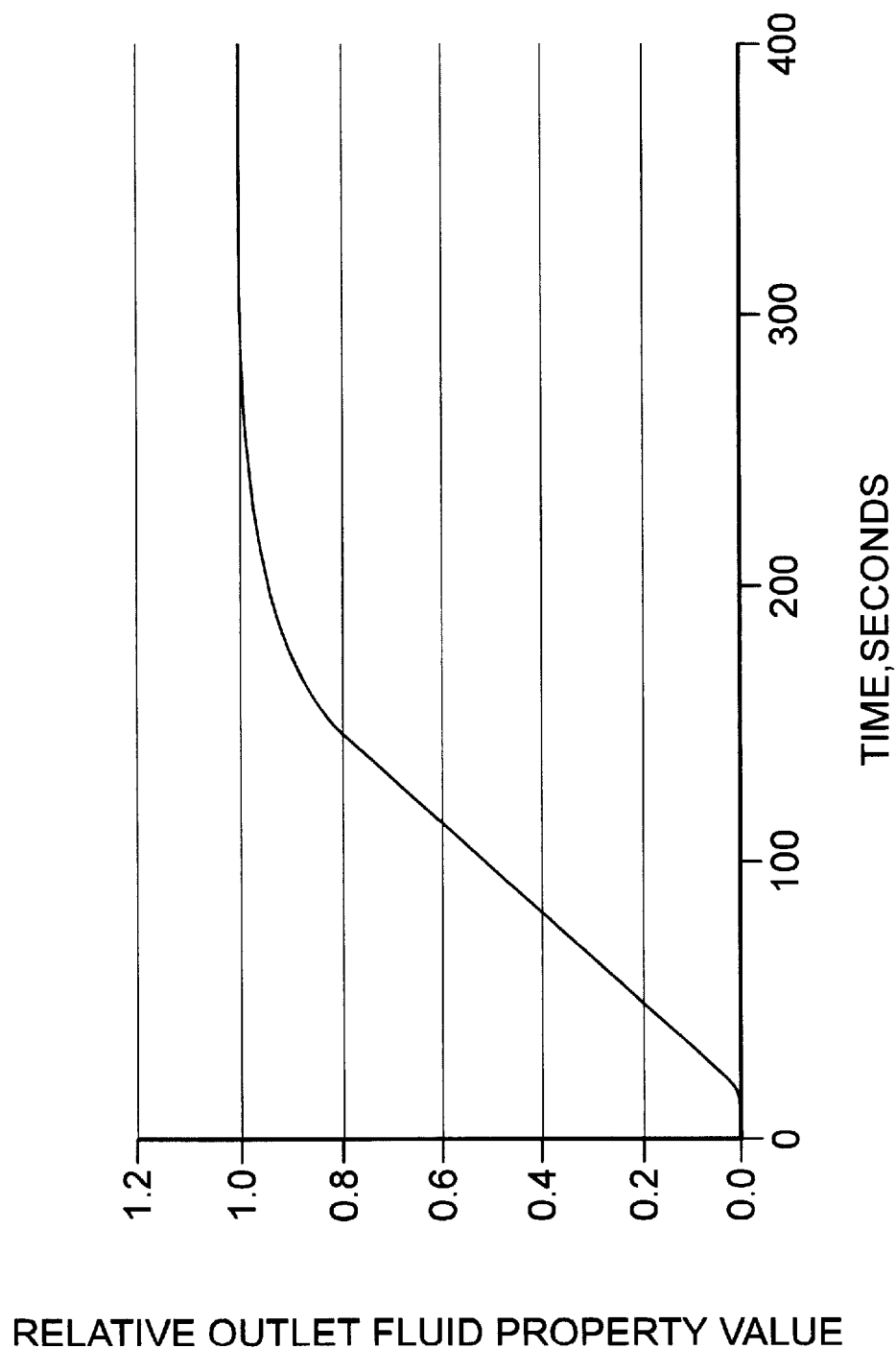
FIG. 4 is a plot of the relative response to a step change in the time-variant fluid property of the inlet stream to the mixing vessel of FIG. 3.
Figure 5:
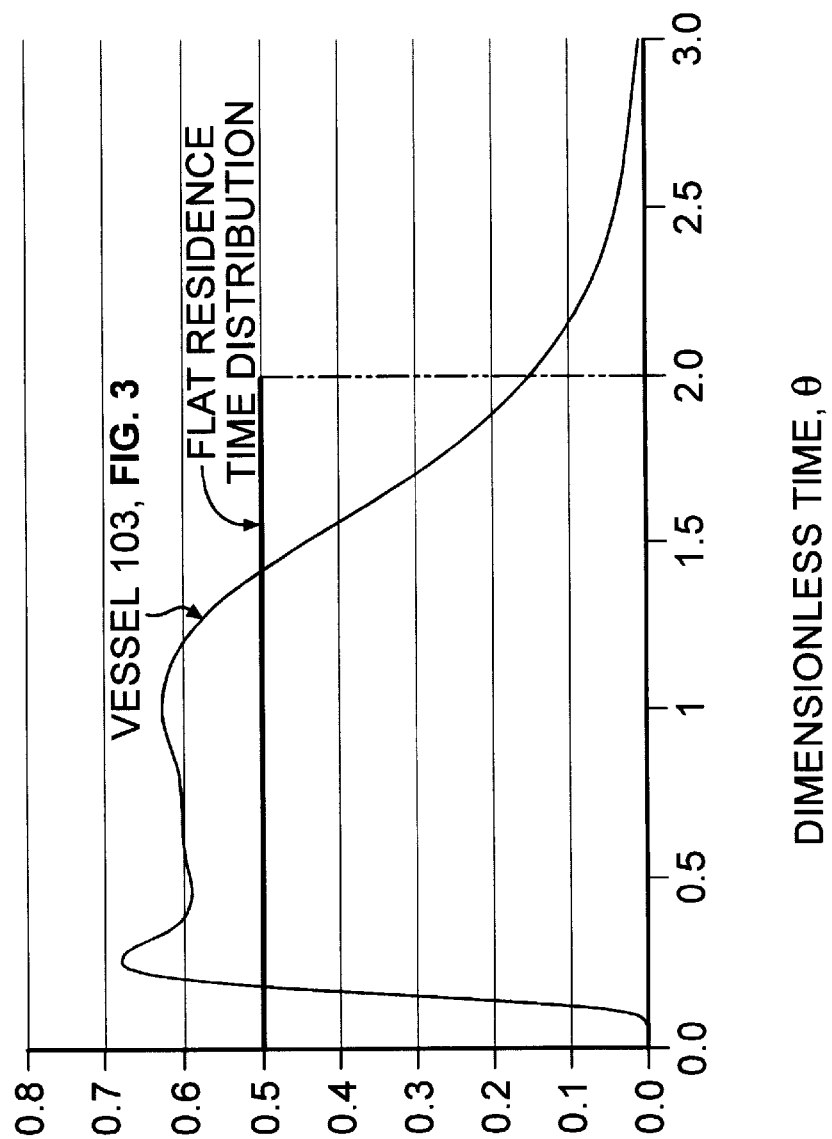
FIG. 5 is a plot of dimensionless residence time distribution vs dimensionless time for the mixing vessel of FIG. 3.

The residence time distribution of the temporal mixing zone in vessel 103 is determined by differentiating the data given in FIG. 4 with time, and the resulting residence time distribution is given in FIG. 5 in the dimensionless residence time distribution parameters $E_\theta$ vs $\theta$ as defined above by eq. 6 and eq. 7. An ideal flat residence time distribution is also given in nondimensional units in FIG. 5 for comparison.

Figure 6:
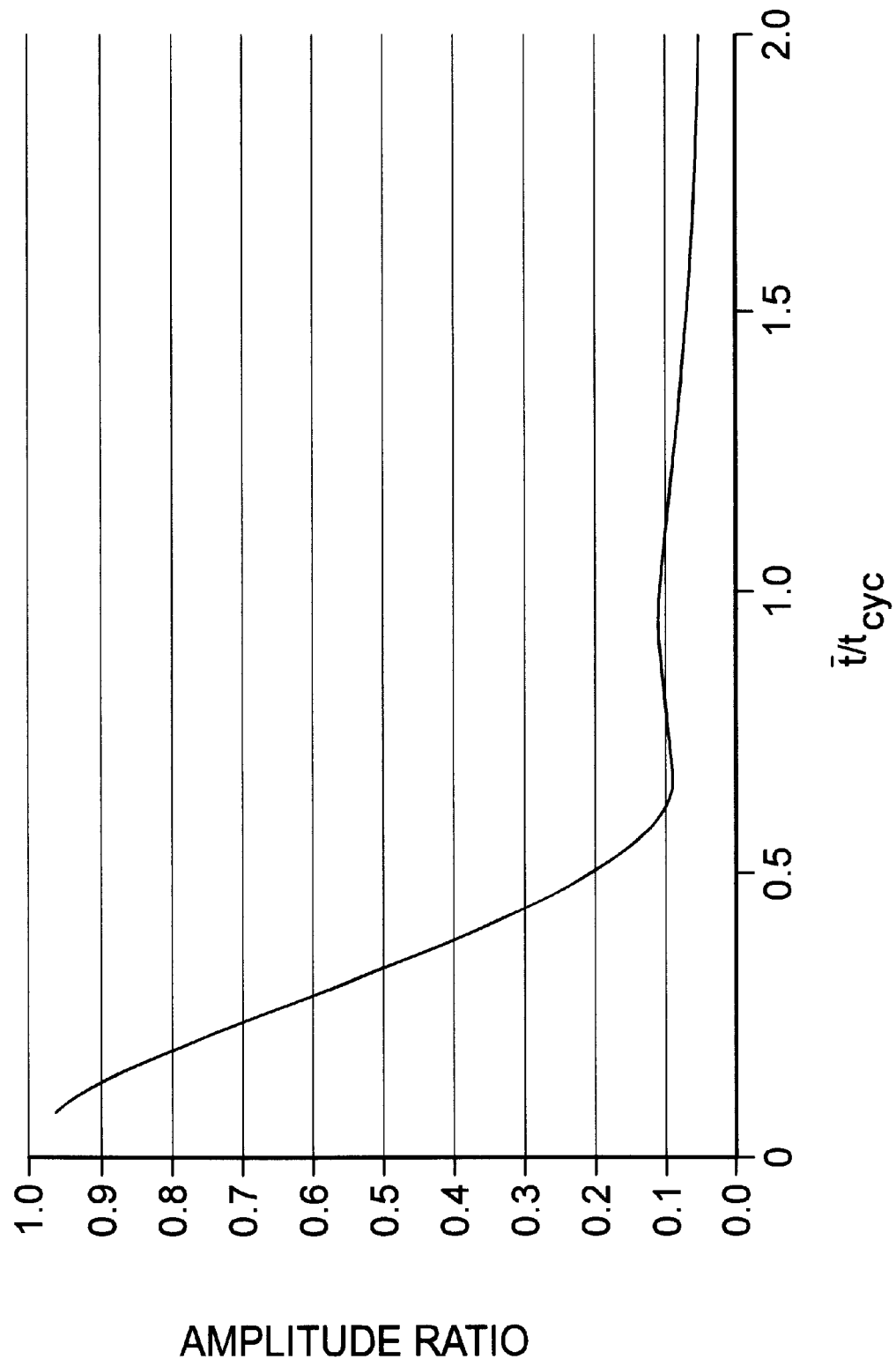
FIG. 6 is a plot of the amplitude ratio vs relative residence time illustrating the attenuation of the amplitude of a sinusoidally-variant inlet fluid property by the mixing vessel of FIG. 3.

The performance of the system of FIG. 3 for attenuating the amplitude of a time-variant inlet fluid property is illustrated according to the theory discussed earlier with reference to FIG. 2. The time variance of a fluid property of inlet stream 101 of FIG. 3 is assumed to be sinusoidal, and the resulting time variance of exit stream 121 is calculated using the residence time distribution of FIG. 5. Outlets 111 to 119 are used in this illustration. The resulting frequency response is shown in FIG. 6 which is a plot of the amplitude ratio vs. the relative residence time of the fluid in the temporal mixing zone of vessel 103. The amplitude ratio is the ratio of the amplitude of the time-variant property of exit stream 121 to that of inlet stream 101. The relative residence time is the ratio of the mean fluid residence time in the temporal mixing zone of vessel 103 to the cycle time of the inlet sinusoidal fluid property. It is seen that an amplitude ratio of about 0.1 can be attained at a relative residence time of about 0.6, which represents a 90% reduction in the time-variant property of inlet stream 101. In comparison, FIG. 2 shows that an ideal mixed flow system at the same relative residence time yields an amplitude ratio of about 0.26, which is significantly higher. Thus the temporal mixing system of FIG. 3 is more effective for attenuating the amplitude of a varying fluid property that the known ideal mixed flow system.

Figure 7:
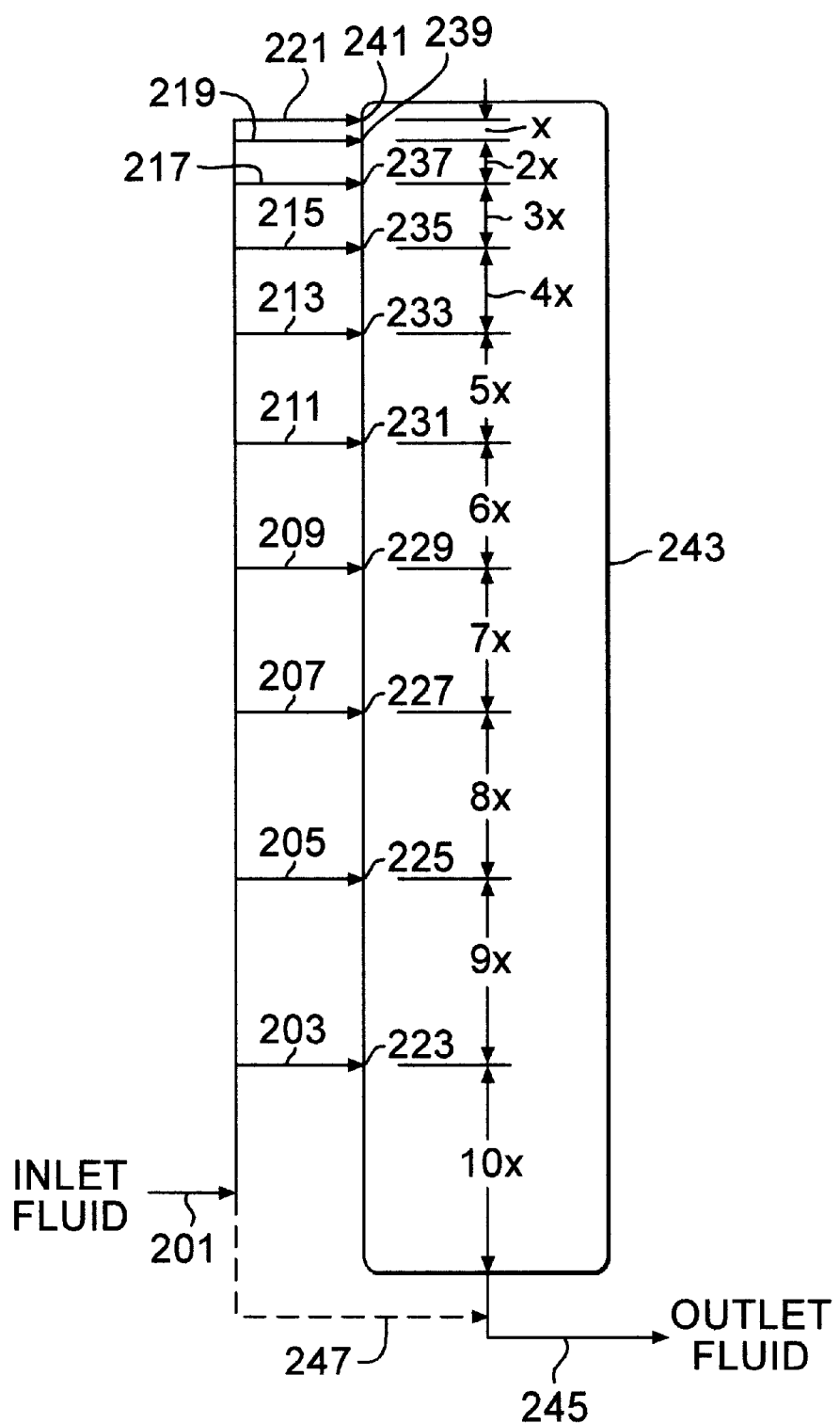
FIG. 7 is a schematic drawing of a mixing vessel according to another embodiment of the present invention.

A second embodiment of the invention is illustrated in FIG. 7. A stream of fluid, which may contain any number of components, has a time-variant fluid property such as concentration and is supplied via line 201. This stream is divided into ten individual streams which flow through lines 203, 205, 207, 209, 211, 213, 215, 217, 219, and 221, and each of these streams flows from these lines through inlets 223, 225, 227, 229, 231, 233, 235, 237, 239, and 241 respectively into mixing vessel 243. Each of the ten lines and inlets is sized to pass about 10% of the total flow of stream in line 201 directly into mixing vessel 243. Mixing vessel 243 preferably is cylindrical and vertical, although other vessel cross sections and orientations could be used if desired.

All fluid which enters mixing vessel 243 via the ten inlets flows downward and exits at the bottom of the vessel via line 245. The preferred axial spacing of the inlet lines along the length of vessel 243 is as follows. The axial distance from the inlet 241 to adjacent inlet 239 is designated generically as x. The axial distance between inlets 239 and 237 is 2x, between inlets 237 and 235 is 3x, between inlets 235 and 233 is 4x, between inlets 233 and 231 is 5x, between inlets 231 and 229 is 6x, between inlets 229 and 227 is 7x, between inlets 227 and 225 is 8x, and between inlets 225 and 223 is 9x. The distance from inlet 223 to vessel outlet 245 is 10x. Thus the total axial distance from inlet 241 to outlet 245 is 55x. The specific spacing between the ten inlets is determined so that the mean residence time of the fluid in any segment of vessel 243 defined by the planes perpendicular to the vessel axis at adjacent inlets is essentially equal to the mean residence time in any other segment between adjacent inlets.

In an optional embodiment, a portion of inlet fluid stream 201 can be diverted through line 247 and combined with the outlet fluid stream in line 245. In this option, inlet fluid in line 201 is divided into eleven essentially equal portions which flow through lines 203–221 and 247. Each of the ten lines 203–221, inlets 223–241, and line 247 is sized to pass about one eleventh or 9.09% of the total flow of the stream in line 201. Alternatively, line 247 can enter mixing vessel 243 at an axial distance of 10x below inlet 223. This optional embodiment will affect the residence time distribution curve of FIG. 5 by moving the curve closer to the dimensionless residence time distribution axis at low values of dimensionless residence time.

In the embodiment of FIG. 7, the mixing zone or temporal mixing zone is identical with the interior of mixing vessel 243. The enclosed volume is defined as that volume enclosed by the apparatus between original inlet fluid line 201 and the outlet fluid line 245.

The mixing zone can be characterized by the axis of vessel 243, and the axial distance $D_n$ from any inlet to the outlet for a vessel having a constant cross sectional area perpendicular to the flow direction can be defined in general terms by $$D_n = (d/N) \sum_{i=0}^{n-1} (N-i) \qquad \text{eq. 11}$$

where n is an integer with a value of 1 through N, integers 1 through N denote sequential inlets, N is the total number of inlets to the mixing vessel, the inlet denoted by n=1 is the inlet nearest the outlet, the inlet denoted by n=N is the inlet farthest from the outlet, and d is the axial distance between the outlet and the inlet nearest the outlet. This definition excludes optional line 247.

While mixing vessel 243 is described above in a vertical orientation with fluid flowing downward, the vessel and the ten inlet lines could be inverted if desired such that the fluid flows upward. As mentioned above, the vessel preferably is vertical but could deviate from vertical if desired. A horizontal vessel would be included within the scope of the invention. Regardless of vessel orientation, temporal mixing will occur in the vessel when different residence times are imparted to a time-variant fluid in a mixing vessel, mixing zone, or enclosed volume by physically dividing the fluid into individual portions, each of which has a different residence time while passing through the mixing vessel, mixing zone, or enclosed volume. The desired fluid portions are created by means of specifically-designed multiple inlets into the mixing vessel or mixing zone and/or by means of specifically-designed multiple outlets from the mixing vessel or mixing zone.

The amplitude of a time-variant property of the fluid in line 201 is attenuated as it flows through the ten inlets, vessel 243, and outlet 245. The performance of mixing vessel 243 can be characterized mathematically by assuming the flow of the fluid in the cylindrical portion of the vessel is ideally mixed in each segment between adjacent inlets. This may occur due to turbulence generated by fluid jetting from the inlets or by the addition of mechanical agitation devices between compartments. It also is assumed that the amount of time that the fluid spends in the each of the 10 inlet lines is negligible compared to the amount of time the fluid spends in mixing vessel 243 between the inlets and outlet 245. Using these assumptions, the fluid flow equations governing the temporal performance of mixing vessel 243 can be formulated and solved to compare the time-variant fluctuations of the fluid property at outlet 245 with the time-variant fluctuations of the fluid property in the inlet stream inline 201. As described earlier, the specific time-variant inlet and outlet fluid properties can be analyzed to determine the theoretical residence time distribution of temporal mixing vessel 243.

Figure 8:
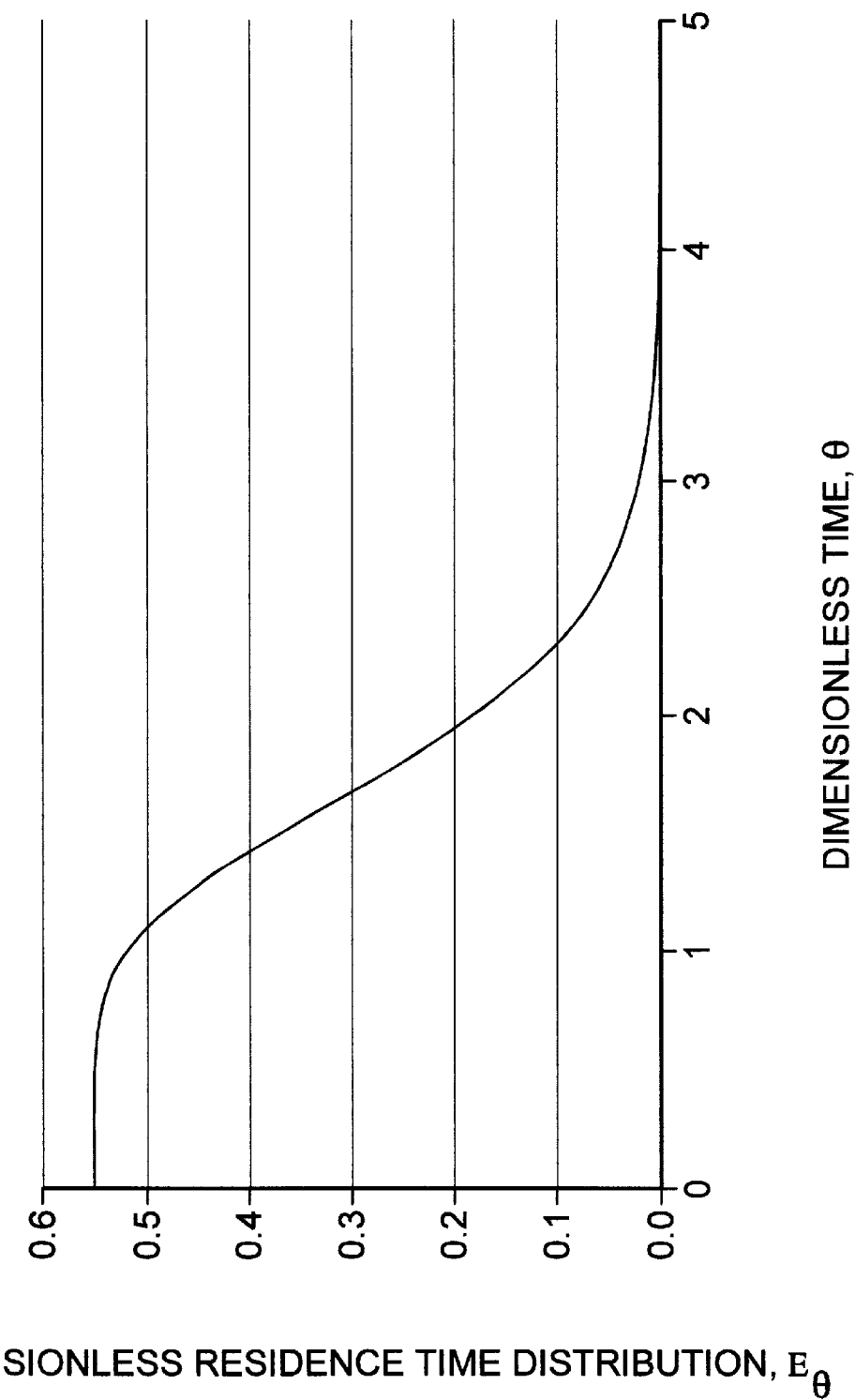
FIG. 8 is a plot of dimensionless residence time distribution vs dimensionless time for the mixing vessel of FIG. 7.
Figure 9:
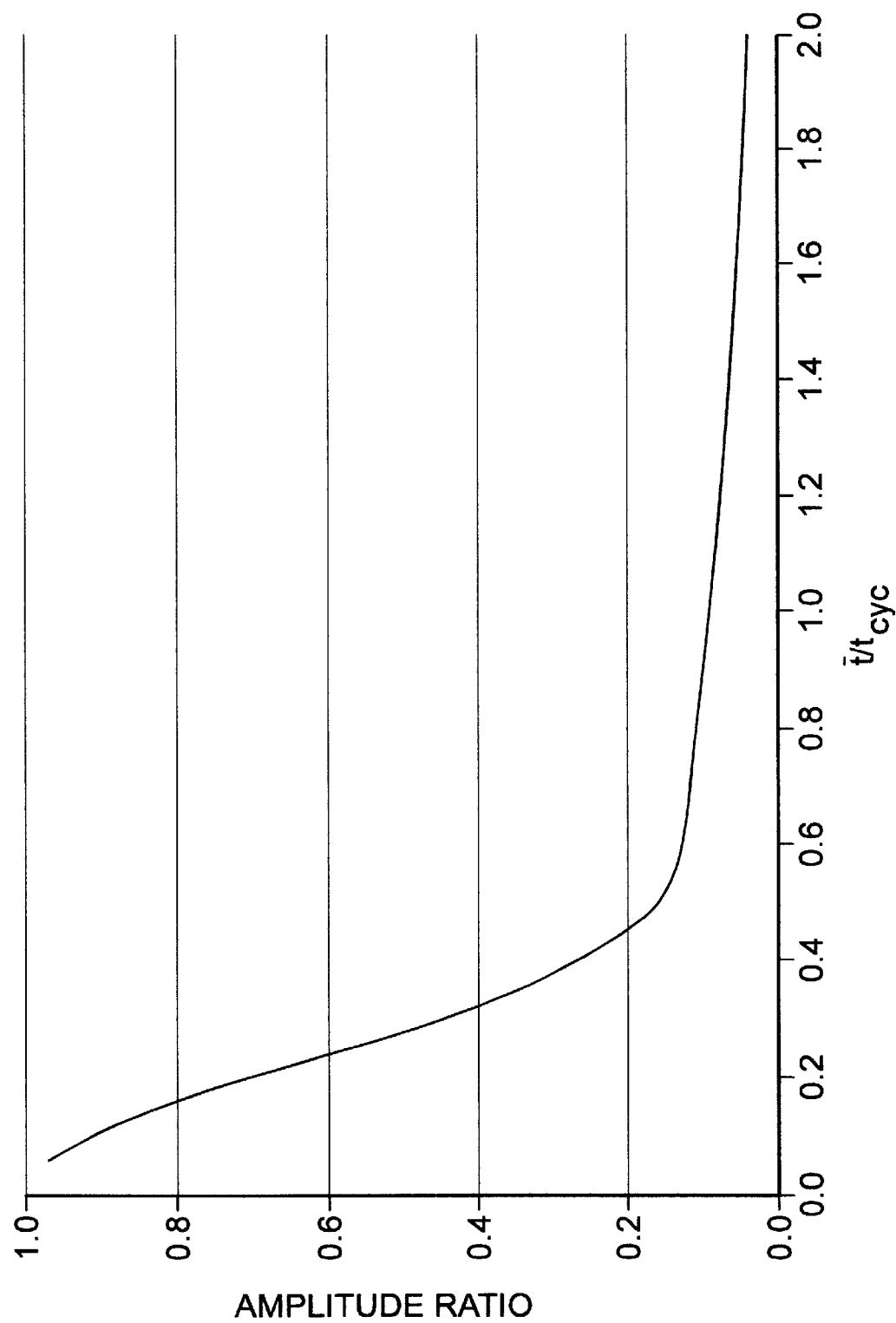
FIG. 9 is a plot of the amplitude ratio vs relative residence time illustrating the attenuation of the amplitude of a sinusoidally-variant inlet fluid property by the mixing vessel of FIG. 7.

The residence time distribution of the fluid in mixing vessel 243 is given in FIG. 8 using the dimensionless residence time distribution parameters $E_\theta$ vs $\theta$ as defined above by eq. 6 and eq. 7. The performance of the system of FIG. 7 for attenuating the amplitude of a time-variant inlet fluid property is illustrated according to the theory discussed earlier with reference to FIG. 2. For this illustration, a sinusoidal time variance of a fluid property of the inlet stream in line 201 of FIG. 7 is assumed, and the resulting time variance of the exit stream in line 245 is calculated using the residence time distribution of FIG. 8. The resulting frequency response is shown in FIG. 9, which is a plot of the amplitude ratio vs. the relative residence time of the fluid in the temporal mixing zone of vessel 243. The amplitude ratio is the ratio of the amplitude of the time-variant property of the exit stream in line 245 to that of the inlet stream in line 201. The relative residence time is the ratio of the mean fluid residence time in the temporal mixing zone of vessel 243 to the cycle time of the sinusoidally varying inlet fluid property, i.e., $\bar{t}/t_{cyc}$. It is seen that an amplitude ratio of about 0.125 can be attained at a relative residence time of about 0.6, which represents an 87.5% reduction in the amplitude of the time-variant property of the inlet stream in line 201. In contrast, FIG. 2 shows that an ideal mixed flow system at the same relative residence time yields an amplitude ratio of about 0.26, which is significantly higher. Thus the embodiment of FIG. 7 is more effective for attenuating the amplitude of a varying fluid property than the known ideal mixed flow system.

The inlet and outlet spacing for the embodiments described above with reference to FIGS. 3 and 7 are based on a vessel having a constant cross sectional area perpendicular to the flow direction and generally parallel sides, for example, a cylinder. However, an important feature of the invention, which is to approach the preferred flat exit residence time distribution as described earlier, can be achieved in vessels or mixing volumes having any shape. The invention includes methods to impart different residence times to a fluid in the mixing zone by physically dividing the fluid into individual portions or volumes, each of which has a different residence time while passing through the mixing vessel, mixing zone, or enclosed volume. The desired fluid portions are created by means of specifically-designed multiple inlets into the mixing vessel or mixing zone and/or by means of specifically-designed multiple outlets from the mixing vessel or mixing zone. The spacing of the inlets or outlets is selected in conjunction with the vessel shape to promote the preferred exit residence time distribution. For example, a conical or frusto-conical vessel could be selected in which the multiple inlets or outlets are equally spaced in the axial direction.

Figure 10:
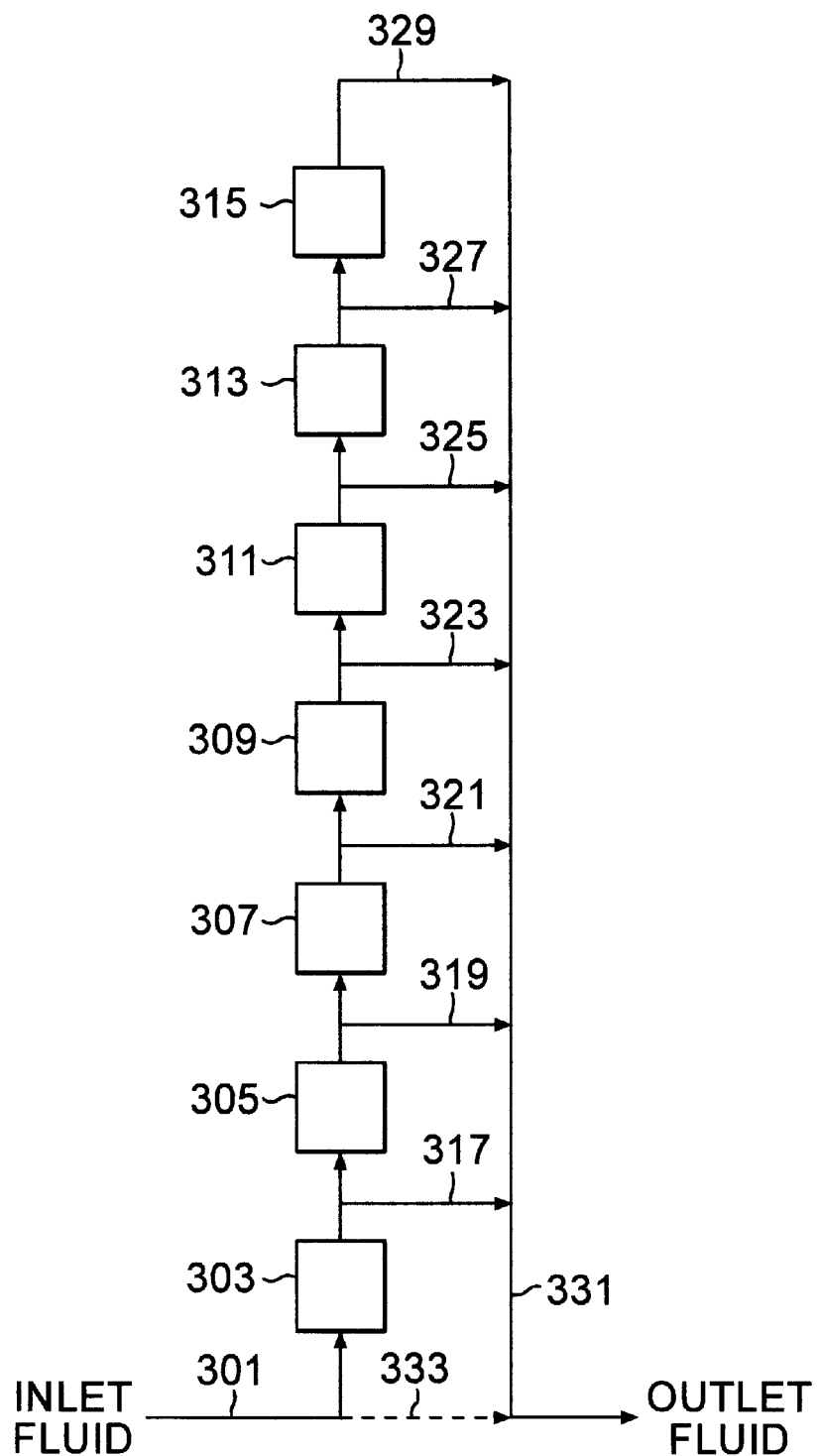
FIG. 10 is a schematic drawing of a mixing vessel according to yet another embodiment of the present invention.

Another embodiment of the invention is illustrated in FIG. 10. A stream with a time-variant fluid property such as concentration is supplied in line 301. This stream, which may contain any number of components, flows in series through seven vessels 303, 305, 307, 309, 311, 313 and 315. The volumes of all seven vessels are essentially the same and each vessel represents one-seventh of the total volume of the system. Fractions of the flows from vessel to vessel are withdrawn as streams in lines 317, 319, 321, 323, 325, and 327, and the remaining fluid is withdrawn from vessel 315 via line 329. All withdrawn streams are combined in manifold 331, from which the final outlet fluid stream is withdrawn. The flow through each successive vessel from 303 to 315 thus decreases and the fluid residence time in each successive vessel increases.

The flow of each of the withdrawn streams 317 through 327 is selected so that the overall fluid residence time distribution of the entire system will approach that of the preferred flat residence time distribution described above. Flow control can be accomplished by placing orifices with holes of selected diameters to restrict flow as required, or by other known means of flow control. The flow rates of the withdrawn streams as fractions of the inlet fluid stream in line 301 are summarized in Table 1 below.

TABLE 1

Fraction of Flow Withdrawn Between Vessels in FIG. 10

| Withdrawn Fluid Line Number | Fraction of Inlet Fluid Flow in Line 301 |
|---|---|
| 317 | 0.084 |
| 319 | 0.092 |
| 321 | 0.102 |
| 323 | 0.116 |
| 325 | 0.138 |
| 327 | 0.179 |
| 329 | 0.289 |

In the embodiment of FIG. 10, the mixing zone or temporal mixing zone is defined by vessels 303 to 315 and the piping between the vessels. The enclosed volume is defined as the entire volume enclosed by the apparatus between original inlet fluid line 301 and the outlet fluid manifold 331.

The temporal performance of the overall system of FIG. 10 can be characterized mathematically by assuming the flow of the fluid in each of the seven vessels 303, 305, 307, 309, 311, 313 and 315 is approximated by two ideally mixed regions each with one-half the volume of each vessel to account for imperfect mixing. This assumption would be valid if incomplete spatial mixing occurred in the vessel. It also is assumed that the residence times of the fluid in the lines connecting the vessels, in lines 317–329, and in manifold 331 are negligible compared to the residence time in any of the seven vessels. Using these assumptions, the equations governing the temporal performance of the system given in FIG. 10 can be formulated and solved to yield the time variance of the property of the fluid leaving manifold 331 for a given time variance of the property of the inlet fluid in line 301.

The residence time distribution of the fluid in the temporal mixing zone of FIG. 10 is given in FIG. 11 using the dimensionless residence time distribution parameters $E_\theta$ vs $\theta$ as defined above by eq. 6 and eq. 7. The performance of the system of FIG. 10 for attenuating the amplitude of a time-variant inlet fluid property is illustrated according to the theory discussed earlier with reference to FIG. 2. For this illustration, a sinusoidal time variance of a fluid property of the inlet stream in line 301 of FIG. 10 is assumed, and the resulting time variance of the outlet stream from manifold 331 is calculated using the residence time distribution of FIG. 11. The resulting frequency response is shown in FIG. 12, which is a plot of the amplitude ratio vs. the relative residence time of the fluid in the seven vessel temporal mixing zone of FIG. 10. The amplitude ratio is the ratio of the amplitude of the time-variant property of the outlet fluid stream in line 331 to that of the inlet fluid stream in line 301. The relative residence time is the ratio of the mean fluid residence time in the seven vessel temporal mixing zone of FIG. 10 to the cycle time of the inlet sinusoidal fluid property, i.e., $\bar{t}/t_{cyc}$. It is seen from FIG. 12 that an amplitude ratio of about 0.125 can be attained at a relative residence time of about 0.6, which represents an 87.5% reduction in the amplitude of the time-variant property of the inlet stream in line 201. In contrast, FIG. 2 shows that an ideal mixed flow system at the same relative residence time yields an amplitude ratio of about 0.26, which is significantly higher. Thus the embodiment of FIG. 10 is more effective for attenuating the amplitude of a varying fluid property that the known ideal mixed flow system.

In an optional mode of the embodiment of FIG. 10, a portion of the inlet fluid in line 301 is diverted through line 333 and combined with the outlet fluid at the end of manifold 331. In this option, the fractions of the inlet fluid in line 304 which flow through each of lines 317–329 and 333 are modified accordingly from those shown in Table 1. This optional mode will affect the residence time distribution curve of FIG. 11 by moving the curve closer to the dimensionless residence time distribution axis at low values of dimensionless time.

The flow rates of the withdrawn streams described above in Table 1 with reference to FIG. 10 are based on each individual vessel (303, 305, 307, 309, 311, 313 and 315) having similar volumes. However, the approach to the preferred flat exit residence time distribution can be achieved with vessels or volumes of any size. The flow rate of the withdrawn stream from each vessel is selected in conjunction with the volume of that vessel to promote the preferred flat exit residence time distribution. For example, by using volumes in FIG. 10 analogous to the volumes between the inlets or outlets of FIG. 3 or FIG. 7 respectively, equal amounts of flow would be withdrawn from each vessel to best represent the preferred flat exit residence time distribution.

In the description of the generic invention and specific embodiments of the invention presented above, the terms "mixing zone" and "enclosed volume" are used. The definitions of these terms are as follows. A mixing zone (also described as a temporal mixing zone) is a defined volume in which fluid mixing occurs. The mixing zone can have one or more inlets through which fluid enters the zone and one or more outlets through which fluid exits the zone. The piping required to transfer fluid to the inlets and transfer fluid from the outlets is outside of the mixing zone and is not considered part of the mixing zone. An enclosed volume is a volume which includes the mixing zone and also includes piping for transferring an inlet fluid into the mixing zone and for withdrawing fluid from the mixing zone to yield an outlet fluid. Thus the enclosed volume includes all apparatus between the entrance of the original time-variant inlet fluid and the exit of the final attenuated time-variant fluid. An enclosed volume could include, for example, two or more mixing zones in series.

As described above, the mixing zone or temporal mixing zone in FIG. 3 is that volume within vessel 103 bounded by distributor 109, the inner walls of vessel 103 above distributor 109, and the inner walls of exit manifold 107 above outlet 111 or above outlet 120 if used. The enclosed volume of FIG. 3 is the entire volume between inlet 105 and outlet 123. In the embodiment of FIG. 7, the mixing zone or temporal mixing zone is identical with temporal mixing vessel 243. The enclosed volume is defined as that volume enclosed by the apparatus between original inlet fluid line 201 and the outlet fluid line 245. In the embodiment of FIG. 10, the mixing zone or temporal mixing zone is defined by vessels 303 to 315 and the piping between the vessels. The enclosed volume is defined as that the volume enclosed by the apparatus between original inlet fluid line 301 and the outlet fluid manifold 331.

In addition to the combinations of the inlet and/or outlet spacing and the flow rates through the inlets and outlets described above, other combinations can be utilized to promote or approach the preferred flat residence time distribution. While the mixing zones described above are cylindrical, any shape can be used for the mixing zone. While the mixing zones described above have multiple inlets with a single outlet or multiple outlets with a single inlet, any combination of inlets and outlets can be used to promote or approach the preferred flat residence time distribution, with the proviso that the number of inlets and the number of outlets cannot both equal one. Preferably, the number of inlets is at least three, the number of outlets is at least three, or the number of inlets is at least three and the number of outlets is at least three.

The spacing between multiple inlets can be equal or unequal, the spacing between multiple outlets can be equal or unequal, the fluid flow rates through multiple inlets can be equal or unequal, and the fluid flow rates through multiple outlets can be equal or unequal. Combinations of these parameters which are envisioned as embodiments of the present invention are summarized in Table 2 below.

TABLE 2

Possible Combinations of Inlet and Outlet Spacing and Fluid Flow Rates

| Inlets | | Outlets | |
|---|---|---|---|
| Spacing | Flow Rates | Spacing | Flow Rates |
| Unequal | Unequal | Unequal | Unequal |
| Unequal | Unequal | Unequal | Equal |
| Unequal | Unequal | Equal | Unequal |
| Unequal | Unequal | Equal | Equal |
| Unequal | Equal | Unequal | Unequal |
| Unequal | Equal | Unequal | Equal |
| Unequal | Equal | Equal | Unequal |
| Unequal | Equal | Equal | Equal |
| Equal | Unequal | Unequal | Unequal |
| Equal | Unequal | Unequal | Equal |
| Equal | Unequal | Equal | Unequal |
| Equal | Unequal | Equal | Equal |
| Equal | Equal | Unequal | Unequal |
| Equal | Equal | Unequal | Equal |
| Equal | Equal | Equal | Unequal |

The method of the present invention is further illustrated by calculating the residence time distributions for previously known fluid mixing configurations, using these residence time distributions to calculate values of the flatness constraint $F_\theta$ and symmetry constraint $S_\theta$ as defined above in eq. 8 and eq. 9, and comparing these values to those of the invention as claimed.

One of the known mixing configurations used in these comparisons is the ideal mixed fluid described earlier with reference to FIG. 1, which is defined as a flow regime in which the flow of fluid through a volume is perfectly mixed. Configurations with a single ideal mixed fluid volume and with 2, 3, and 5 ideal mixed fluid volumes in series were used in these examples. When more than one ideal mixed fluid volume in series is used, this model is typically called the tanks-in-series model (see Levenspiel cited above) and is a one-parameter model widely used to represent nonideal flow. By adjusting the number of tanks in series, the one parameter, this model has been used to represent a wide range of residence time distributions.

Dispersed plug flow or the dispersion model (see Levenspiel cited above) is another well-known one-parameter model for nonideal flow which is used in these examples. By adjusting the dispersion number D/u/L, which is the one parameter, this model also has been used to represent a wide range of residence time distributions.

Another previously known mixing configuration included in these examples is similar to the configuration of FIG. 7 but has a number of inlet or outlet holes spaced equidistantly along a manifold located coaxially within a cylindrical mixing vessel.

Table 3 summarizes the results of these calculations and compares them with the theoretical flat residence time distribution and with three embodiments of the invention given above.

TABLE 3

Comparison of Flatness and Symmetry Constraints for Different Mixing Regimes

| Example | Mixing Regime | Flatness Constraint $F_\theta$ (Eq. 8) | Symmetry Constraint $S_\theta$ (Eq. 9) |
|---|---|---|---|
| 1 | Single Ideal Mixed Fluid Volume | 0.135 | 0.223 |
| 2 | Two Ideal Mixed Fluid Volumes in Series | 0.091 | 0.109 |
| 3 | Three Ideal Mixed Fluid Volumes in Series | 0.124 | 0.081 |
| 4 | Five Ideal Mixed Fluid Volumes in Series | 0.212 | 0.058 |
| 5 | Dispersed Axial Plug Flow (D/u/L = 0.25) | 0.119 | 0.052 |
| 6 | Dispersed Axial Plug Flow (D/u/L = 0.30) | 0.118 | 0.053 |
| 7 | Dispersed Axial Plug Flow (D/u/L = 0.35) | 0.120 | 0.053 |
| 8 | Dispersed Axial Plug Flow (D/u/L = 0.50) | 0.132 | 0.054 |
| 9 | FIG. 7 with Equidistant Outlets or Inlets | 0.135 | 0.223 |
| 10 | Flat Residence Time Distribution | 0.000 | 0.000 |
| 11 | Present Invention Embodiment of FIG. 3 | 0.077 | 0.036 |
| 12 | Present Invention Embodiment of FIG. 7 | 0.039 | 0.052 |
| 13 | Present Invention Embodiment of FIG. 11 | 0.041 | 0.045 |

Examples 1–4 show that no number of volumes in series will meet both of the required flatness and symmetry constraints. Examples 5–8 show that no dispersion number exists for which the dispersed plug flow model meets both of these constraints.

The embodiments of FIGS. 3, 7, and 11 used in Examples 11–13 satisfy both requirements that the flatness constraint $F_\theta$ be equal to or less than 0.11 and that the symmetry constraint $S_\theta$ be equal to or less than 0.075. The flat residence time distribution of the present invention satisfies both constraints, since by definition the flatness constraint $F_\theta$ and symmetry constraint $S_\theta$ are zero for a flat residence time distribution. In contrast, none of the known mixing regimes of Examples 1–9 satisfies both of these constraints simultaneously.

Thus the present invention offers a new method for attenuating the amplitude of time-variant properties of a fluid stream by controlled mixing in a mixing vessel, mixing zone, or enclosed volume. This is accomplished by the concept of temporal mixing in which different residence times are imparted to a time-variant fluid in a mixing zone by physically dividing the fluid into individual portions, each of which has a different residence time while passing through the mixing zone. The desired fluid portions are created by means of specifically-designed multiple inlets into the mixing vessel or mixing zone and/or by means of specifically-designed multiple outlets from the mixing zone. Inlet and outlet designs include inlet spacing, outlet spacing, and the fluid flow rates through each inlet and outlet.

Application of the invention allows an approach to the preferred flat residence time distribution of the fluid withdrawn from the mixing zone. Any combination of inlets and outlets with any combination of inlet and outlet fluid flow rates can be used to promote or approach this preferred flat residence time distribution. This invention differs from earlier known methods of mixing in which the amplitude of time-variant fluid properties is attenuated by spatial mixing in which mixing in a vessel is promoted by mechanical agitation, inlet distributors or jets which utilize pressure drop to promote mixing, by baffles which promote turbulence, or by promoting naturally occurring phenomena such as convection and diffusion. In contrast, the present invention maximizes temporal mixing by the methods described above.

The characteristics of the present invention are described completely in the foregoing disclosure. One skilled in the art can understand the invention from this disclosure and can make various modifications to the invention which are within the scope of the claims which follow.

What is claimed is:

1. A method for attenuating the amplitude of a time-variant property of a fluid stream which comprises introducing into an enclosed volume an inlet fluid stream having a time-variant property, dividing the fluid within the enclosed volume into portions of fluid having different residence times therein, combining the portions of fluid, and withdrawing from the enclosed volume an outlet fluid stream having an attenuated time-variant property such that the residence time distribution of the outlet fluid stream is characterized by a flatness constraint $F_\theta$ equal to or less than about 0.11 and a symmetry constraint $S_\theta$ equal or less than about 0.075, wherein the flatness constraint $F_\theta$ is defined as $$F_\theta = \int_0^2 [0.5 - E_\theta(\theta)]^2 d\theta + \int_2^\infty [E_\theta(\theta)]^2 d\theta$$

and the symmetry constraint $S_\theta$ is defined as $$S_\theta = \int_0^1 [E_\theta(\theta) - E_\theta(2-\theta)]^2 d\theta + \int_2^\infty [E_\theta(\theta)]^2 d\theta$$

where the function $E_\theta(\theta)$ is the overall dimensionless residence time distribution of the outlet fluid stream and $\theta$ is the dimensionless time.

2. The method of claim 1 wherein the time-variant property of the fluid stream varies randomly with time.

3. The method of claim 1 wherein the time-variant property of the fluid stream varies periodically with time.

4. The method of claim 3 wherein the enclosed volume comprises a mixing zone and piping for dividing the inlet fluid stream into multiple fluid streams which are introduced into the mixing zone at multiple locations.

5. The method of claim 4 wherein the fluid in the mixing zone has a mean residence time defined as the volume of the mixing zone divided by the actual volumetric flow rate of the inlet fluid stream, and wherein this mean residence time is between about 0.3 and about 0.7 times the period of a cyclic time-variant property of the inlet fluid stream.

6. The method of claim 3 wherein the enclosed volume comprises a mixing zone and piping for withdrawing fluid from the mixing vessel at multiple locations.

7. The method of claim 6 wherein the fluid withdrawn from the mixing zone at multiple locations is combined into an outlet fluid stream, wherein the mixing zone has a mean residence time defined as the volume of the mixing zone divided by the actual volumetric flow rate of the inlet fluid stream, and wherein this mean residence time is between about 0.3 and about 0.7 times the period of a cyclic time-variant property of the inlet fluid stream.

8. The method of claim 1 wherein the time-variant property of the inlet fluid stream is selected from the group consisting of temperature, the concentration of a component in the stream, pH, thermal conductivity, electrical conductivity, viscosity, molecular weight, heat capacity, lower heating value, and higher heating value.

9. The method of claim 1 wherein the inlet fluid stream is a multicomponent gas mixture comprising hydrogen, methane and carbon dioxide, and the time-variant property of the inlet fluid stream is the concentration of methane therein.

10. The method of claim 9 wherein the inlet fluid stream comprises blowdown gas and purge effluent gas from a pressure swing adsorption process for removing at least methane and carbon dioxide from a mixture comprising at least hydrogen, methane, and carbon dioxide.

11. A method for attenuating the amplitude of a time-variant property of a fluid stream which comprises dividing an inlet fluid stream having a time-variant property into three or more individual fluid streams, introducing each of the individual fluid streams into a mixing zone at a different entrance location in the zone, and withdrawing from an outlet location of the mixing zone an outlet fluid stream having a time-variant property amplitude which is attenuated relative to the amplitude of the time-variant property of the inlet fluid stream, wherein (1) at least first, second, and third individual fluid streams are withdrawn successively from the inlet fluid stream and introduced into the mixing zone at first, second, and third entrance locations, respectively, wherein the distances from the outlet location to the first, second, and third entrance locations increase respectively, and wherein the distance between the second and third entrance locations is less than the distance between the first and second entrance locations, or (2) the flow rate of one of the individual fluid streams is different than the flow rate of another of the individual fluid streams, or (3) the flow rate of one of the individual fluid streams is different than the flow rate of another of the individual fluid streams and at least first, second, and third individual fluid streams are withdrawn successively from the inlet fluid stream and introduced into the mixing zone at first, second, and third entrance locations, respectively, wherein the distances from the outlet location to the first, second, and third entrance locations increase respectively, and wherein the distance between the second and third entrance locations is less than the distance between the first and second entrance locations.

12. A method for attenuating the amplitude of a time-variant property of a fluid stream which comprises (a) dividing an inlet fluid stream having a time-variant property into three or more individual fluid streams, introducing each of the individual fluid streams into a mixing zone at a different entrance location in the zone, and withdrawing from the mixing zone an outlet fluid stream having a time-variant property amplitude which is attenuated relative to the amplitude of the time-variant property of the inlet fluid stream, wherein (1) the distance between at least one pair of adjacent entrance locations is different than the distance between another pair of adjacent entrance locations, or (2) the flow rate of one of the individual fluid streams is different than the flow rate of another of the individual fluid streams, or (3) the distance between at least one pair of adjacent entrance locations is different than the distance between another pair of adjacent entrance locations and the flow rate of one of the individual fluid streams is different than the flow rate of another of the individual fluid streams; and (b) attenuating the amplitude of a time-variant property of the outlet fluid stream by dividing the outlet fluid stream into three or more additional individual fluid streams, introducing each of the additional individual fluid streams into an additional mixing zone at a different respective entrance location in the zone, and withdrawing from the additional mixing zone a second outlet fluid stream having a time-variant property of which the amplitude is further attenuated relative to the amplitude of the time-variant property of the outlet fluid stream, wherein in the additional mixing vessel (1) the distance between at least one pair of adjacent entrance locations is different than the distance between another pair of adjacent entrance locations, or (2) the flow rate of one of the individual fluid streams is different than the flow rate of another of the individual fluid streams, or (3) the distance between at least one pair of adjacent entrance locations is different than the distance between another pair of adjacent entrance locations and the flow rate of one of the individual fluid streams is different than the flow rate of another of the individual fluid streams.

13. The method of claim 11 which further comprises withdrawing one or more additional outlet fluid streams from the mixing zone, wherein the outlet fluid stream and the additional outlet fluid streams are withdrawn at different exit locations in the mixing zone, wherein (1) the distance between at least one pair of adjacent exit locations is different than the distance between another pair of adjacent exit locations, or (2) the flow rate of one of the outlet fluid streams is different than the flow rate of another of the outlet fluid streams, or (3) the distance between at least one pair of adjacent exit locations is different than the distance between another pair of adjacent exit locations and the flow rate of one of the outlet fluid streams is different than the flow rate of another of the outlet fluid streams.

14. A method for attenuating the amplitude of a time-variant property of a fluid stream which comprises introducing into an inlet location in a mixing zone an inlet fluid stream having a time-variant property, withdrawing three or more individual fluid portions at different exit locations in the mixing zone, and combining the three or more individual fluid portions into a combined exit fluid stream having a time-variant property of which the amplitude is attenuated relative to the amplitude of the time-variant property of the inlet fluid stream, wherein (1) the distances between pairs of adjacent exit locations decrease as the distances between each adjacent exit location and the inlet location increase, or (2) the flow rate of one of the individual fluid portions is different than the flow rate of another of the individual fluid portions, or (3) the distances between pairs of adjacent exit locations decrease as the distances between each adjacent exit location and the inlet location increase and the flow rate of one of the individual fluid portions is different than the flow rate of another of the individual fluid portions.

15. A method for attenuating the amplitude of a time-variant property of a fluid stream which comprises
(a) introducing an inlet fluid stream having a time-variant property into a mixing zone, withdrawing three or more individual fluid portions at different exit locations in the mixing zone, and combining the three or more individual fluid portions into a combined exit fluid stream having a time-variant property of which the amplitude is attenuated relative to the amplitude of the time-variant property of the inlet fluid stream, wherein (1) the distance between at least one pair of adjacent exit locations is different than the distance between another pair of adjacent exit locations, or (2) the flow rate of one of the individual fluid portions is different than the flow rate of another of the individual fluid portions, or (3) the distance between at least one pair of adjacent exit locations is different than the distance between another pair of adjacent exit locations and the flow rate of one of the individual fluid portions is different than the flow rate of another of the individual fluid portions; and (b) introducing the combined exit fluid stream into an additional mixing zone, withdrawing three or more individual fluid portions at different exit locations in the mixing zone, and combining the three or more individual fluid portions into another combined exit fluid stream having a time-variant property of which the amplitude is attenuated relative to the amplitude of a time-variant property of the combined exit fluid stream, wherein (1) the distance between at least one pair of adjacent exit locations is different than the distance between another pair of adjacent exit locations, or (2) the flow rate of one of the individual fluid portions is different than the flow rate of another of the individual fluid portions, or (3) the distance between at least one pair of adjacent exit locations is different than the distance between another pair of adjacent exit locations and the flow rate of one of the individual fluid portions is different than the flow rate of another of the individual fluid portions.

16. A method for attenuating the amplitude of a time-variant property of a fluid which comprises introducing into a mixing zone two or more inlet fluid streams through two or more inlets and withdrawing two or more outlet fluid streams from the mixing zone through two or more outlets, with the provisos that (1) the number of inlet fluid streams and the number of outlet fluid streams cannot both equal one, and (2) the number of inlet fluid streams is at least three, or the number of outlet fluid streams is at least three, or the number of inlet fluid streams is at least three and the number of outlet fluid streams is at least three; wherein (a) the flow rate of one of the inlet fluid streams is different than the flow rate of another of the inlet fluid streams, or (b) the flow rate of one of the outlet fluid streams is different than the flow rate of another of the outlet fluid streams, or (c) the flow rate of one of the inlet fluid streams is different than the flow rate of another of the inlet fluid streams and the flow rate of one of the outlet fluid streams is different than the flow rate of another of the outlet fluid streams.

17. A method for attenuating the amplitude of a time-variant property of a fluid stream which comprises dividing an inlet fluid stream having a time-variant property into three or more individual fluid streams, introducing each of the individual fluid streams into a mixing zone at a different entrance location in the zone, and withdrawing from the mixing zone an outlet fluid stream having a time-variant property amplitude which is attenuated relative to the amplitude of the time-variant property of the inlet fluid stream, wherein (a) the distance between at least one pair of adjacent entrance locations is different than the distance between another pair of adjacent entrance locations; or the flow rate of one of the individual fluid streams is different than the flow rate of another of the individual fluid streams; or the distance between at least one pair of adjacent entrance locations is different than the distance between another pair of adjacent entrance locations and the flow rate of one of the individual fluid streams is different than the flow rate of another of the individual fluid streams; and (b) the residence time distribution of the outlet fluid stream is characterized by a flatness constraint $F_\theta$ equal to or less than about 0.11 and a symmetry constraint $S_\theta$ equal or less than about 0.075, wherein the flatness constraint $F_\theta$ is defined as $$F_\theta = \int_0^2 [0.5 - E_\theta(\theta)]^2 \, d\theta + \int_2^\infty [E_\theta(\theta)]^2 \, d\theta$$

and the symmetry constraint $S_\theta$ is defined as $$S_\theta = \int_0^1 [E_\theta(\theta) - E_\theta(2-\theta)]^2 \, d\theta + \int_2^\infty [E_\theta(\theta)]^2 \, d\theta$$

where the function $E_\theta(\theta)$ is the overall dimensionless residence time distribution of the outlet fluid stream and $\theta$ is the dimensionless time.

18. A method for attenuating the amplitude of a time-variant property of a fluid stream which comprises introducing an inlet fluid stream having a time-variant property into a mixing zone, withdrawing three or more individual fluid portions at different exit locations in the mixing zone, and combining the three or more individual fluid portions into a combined exit fluid stream having a time-variant property of which the amplitude is attenuated relative to the amplitude of the time-variant property of the inlet fluid stream, wherein (a) the distance between at least one pair of adjacent exit locations is different than the distance between another pair of adjacent exit locations; or the flow rate of one of the individual fluid portions is different than the flow rate of another of the individual fluid portions; or the distance between at least one pair of adjacent exit locations is different than the distance between another pair of adjacent exit locations and the flow rate of one of the individual fluid portions is different than the flow rate of another of the individual fluid portions; and (b) the residence time distribution of the outlet fluid stream is characterized by a flatness constraint $F_\theta$ equal to or less than about 0.11 and a symmetry constraint $S_\theta$ equal or less than about 0.075, wherein the flatness constraint $F_\theta$ is defined as $$F_\theta = \int_0^2 [0.5 - E_\theta(\theta)]^2 \, d\theta + \int_2^\infty [E_\theta(\theta)]^2 \, d\theta$$

and the symmetry constraint $S_\theta$ is defined as $$S_\theta = \int_0^1 [E_\theta(\theta) - E_\theta(2-\theta)]^2 \, d\theta + \int_2^\infty [E_\theta(\theta)]^2 \, d\theta$$

where the function $E_\theta(\theta)$ is the overall dimensionless residence time distribution of the outlet fluid stream and $\theta$ is the dimensionless time.

* * * * *